INVENTOR.
Donald G. Langley

INVENTOR.
Donald G. Langley

Jan. 18, 1966     D. G. LANGLEY     3,229,532
FREE GYRO FITTED WITH TWO-AXIS AND PRESET CAGING MECHANISM
Filed Jan. 18, 1960     11 Sheets-Sheet 3
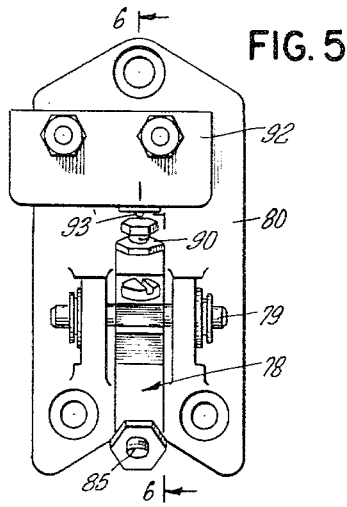
FIG. 5
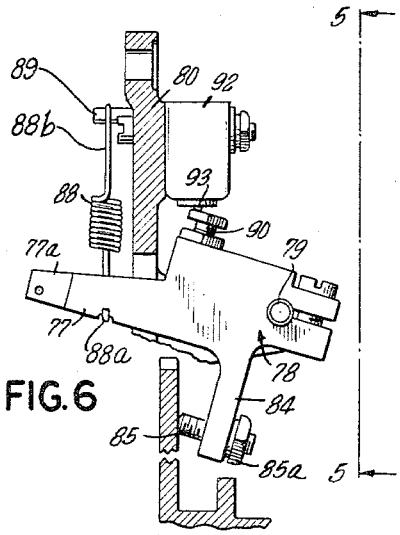
FIG. 6
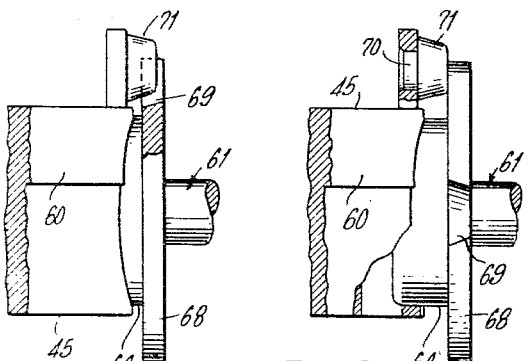
FIG. 10     FIG. 9     FIG. 7
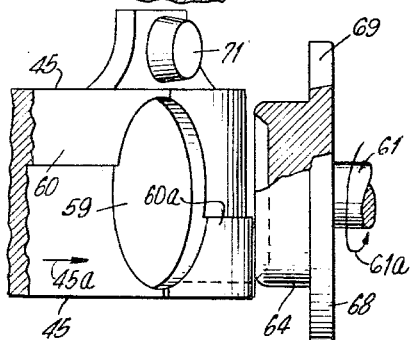
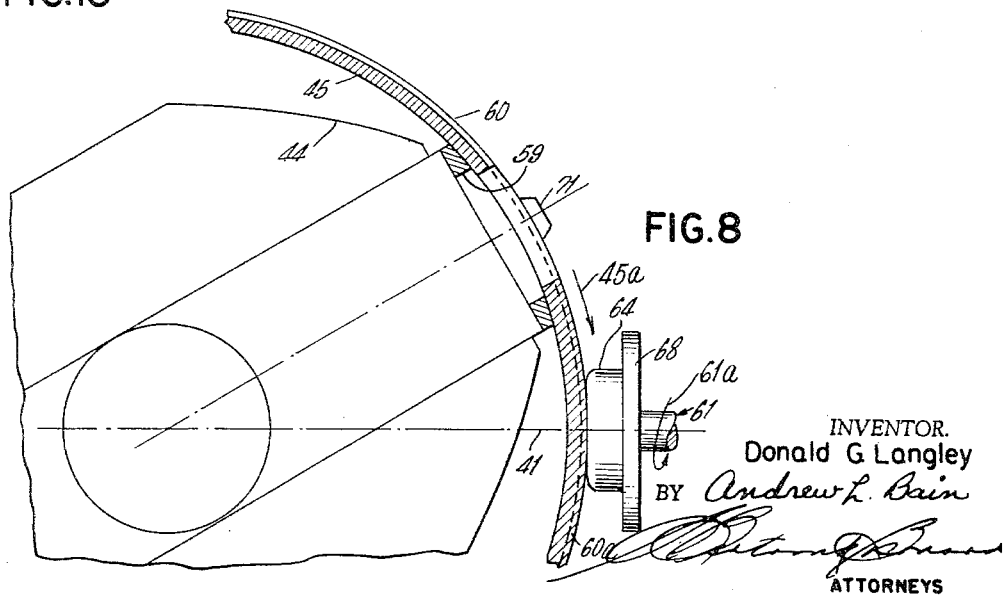
FIG. 8
INVENTOR.
Donald G. Langley
BY Andrew L. Bain
ATTORNEYS

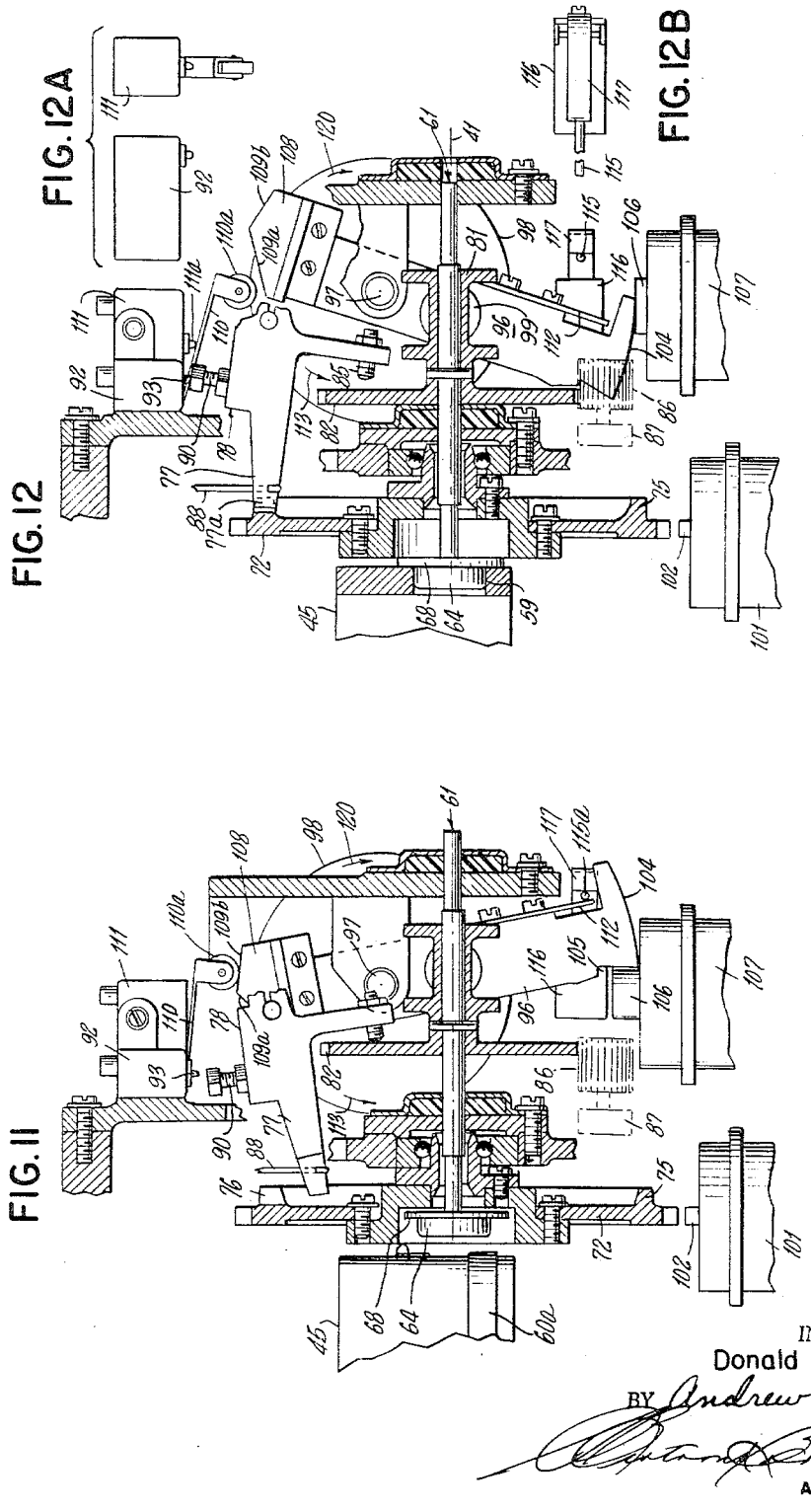

Jan. 18, 1966     D. G. LANGLEY     3,229,532
FREE GYRO FITTED WITH TWO-AXIS AND PRESET CAGING MECHANISM
Filed Jan. 18, 1960        11 Sheets-Sheet 5
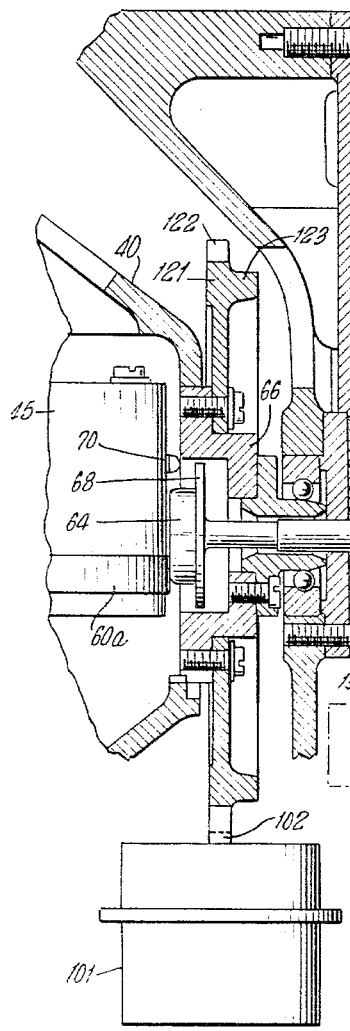
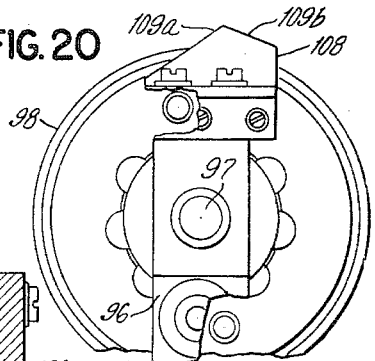
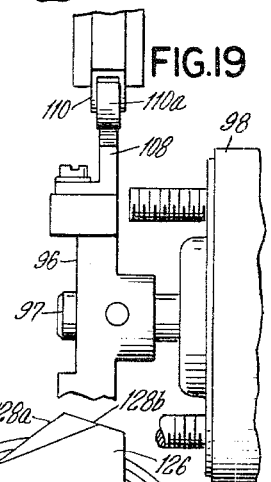
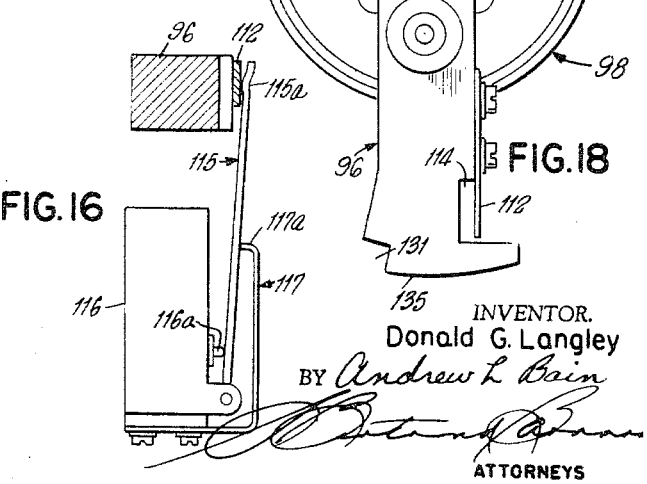
INVENTOR.
Donald G. Langley
BY Andrew L. Bain
ATTORNEYS

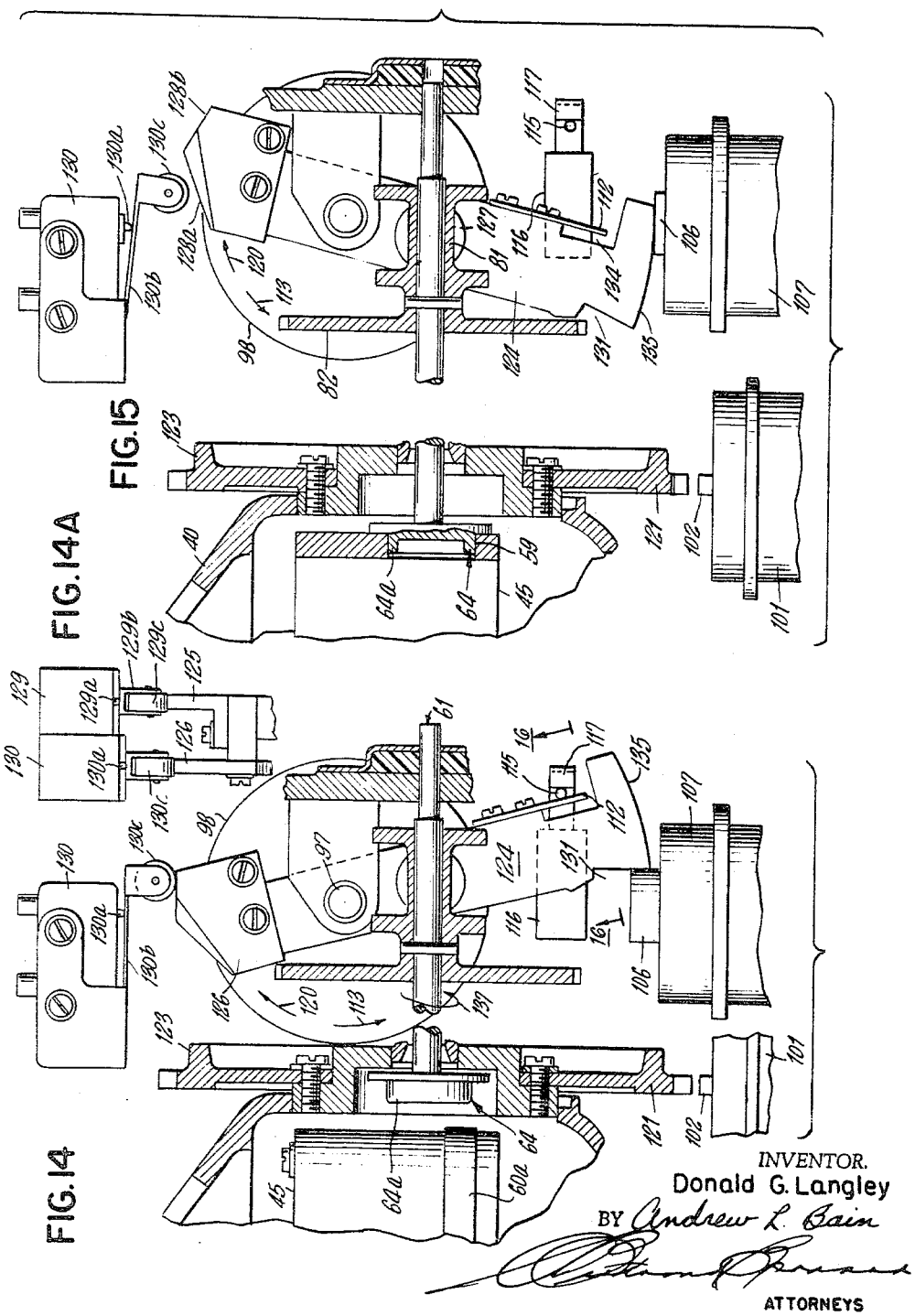

Jan. 18, 1966 D. G. LANGLEY 3,229,532
FREE GYRO FITTED WITH TWO-AXIS AND PRESET CAGING MECHANISM
Filed Jan. 18, 1960 11 Sheets-Sheet 8
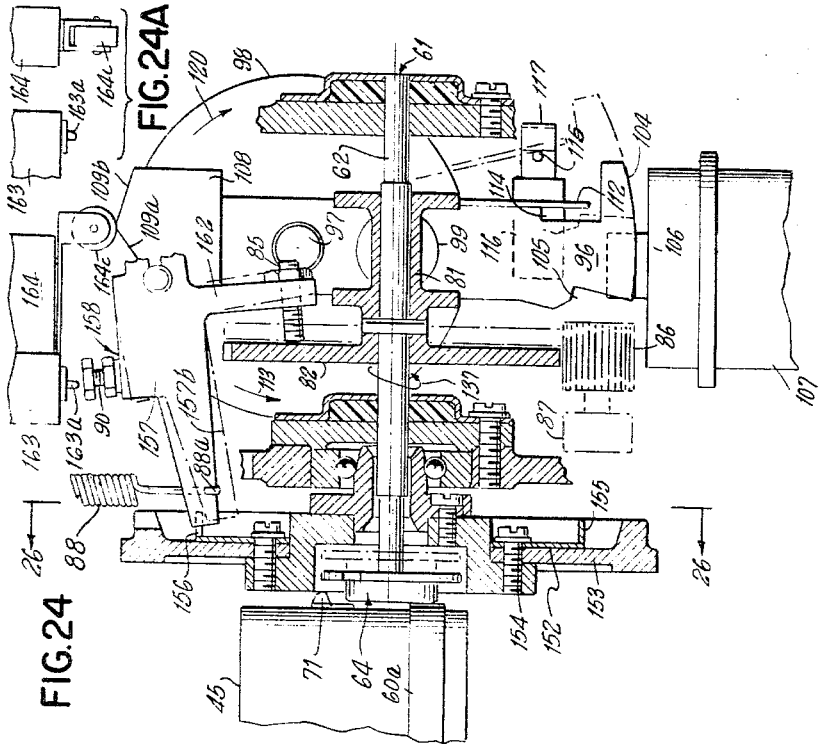
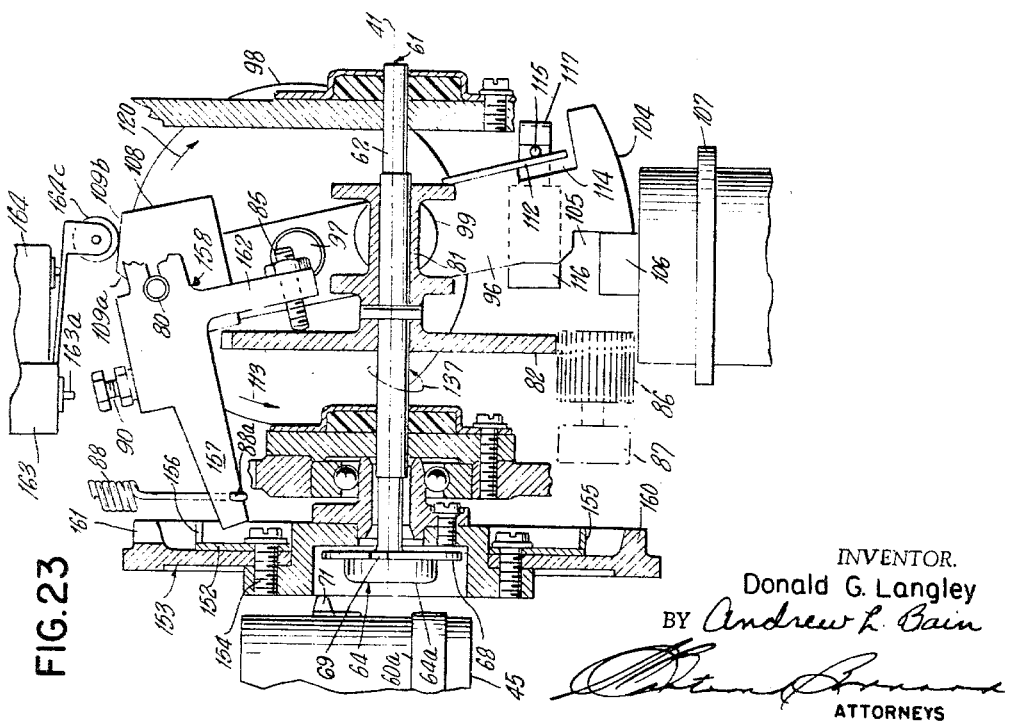
INVENTOR.
Donald G. Langley
BY Andrew L. Bain
ATTORNEYS

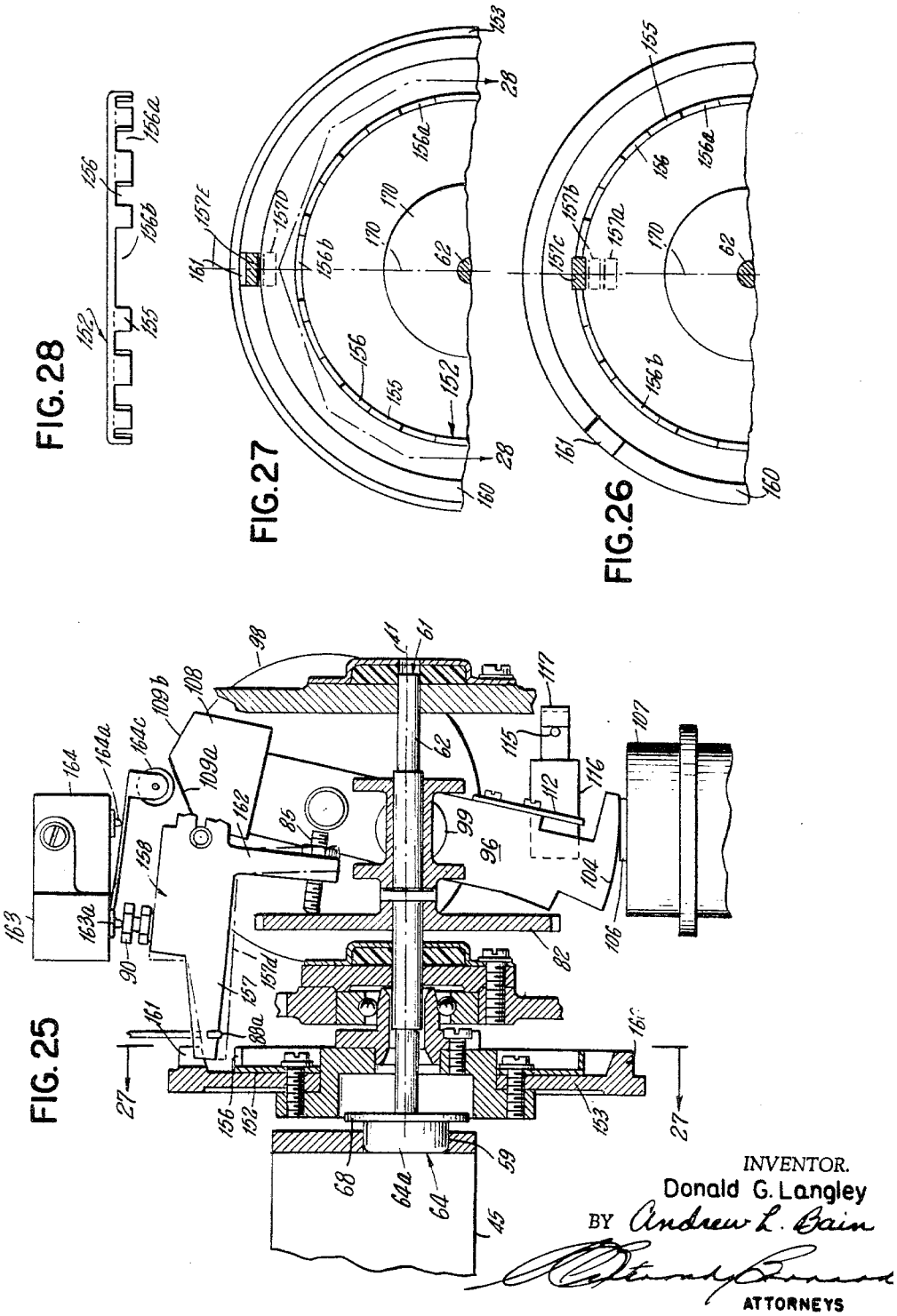

Jan. 18, 1966    D. G. LANGLEY    3,229,532
FREE GYRO FITTED WITH TWO-AXIS AND PRESET CAGING MECHANISM
Filed Jan. 18, 1960    11 Sheets-Sheet 10
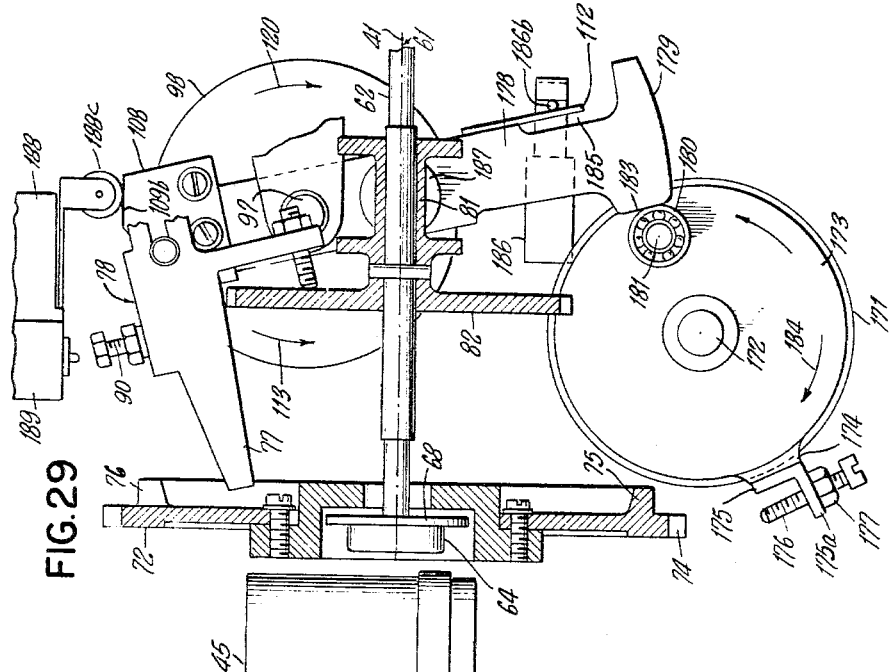
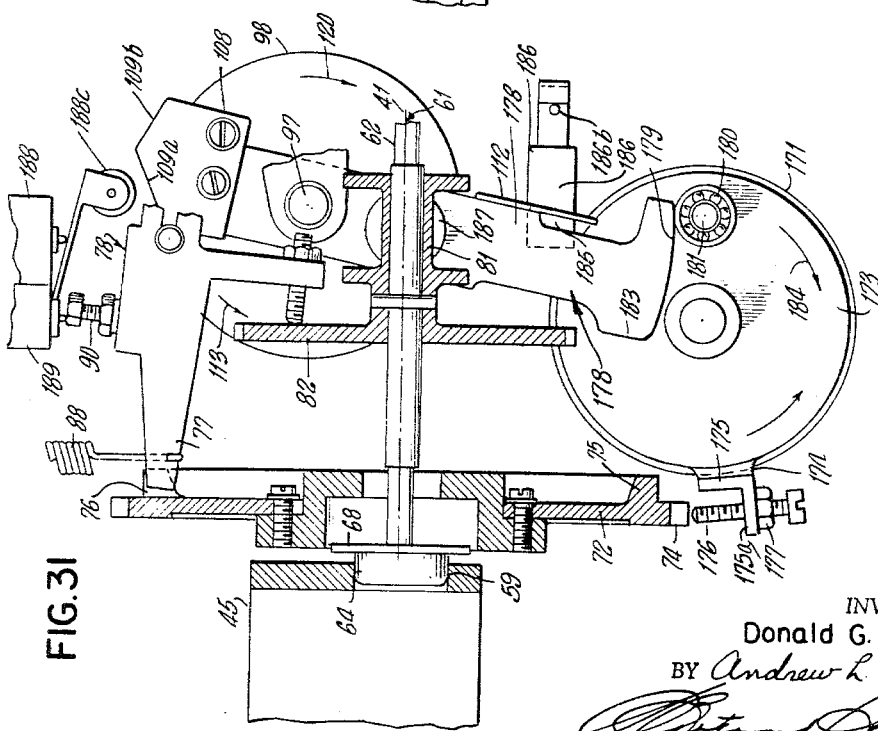
INVENTOR.
Donald G. Langley
ATTORNEYS Jan. 18, 1966     D. G. LANGLEY     3,229,532
FREE GYRO FITTED WITH TWO-AXIS AND PRESET CAGING MECHANISM
Filed Jan. 18, 1960     11 Sheets-Sheet 11

DONALD G. LANGLEY
INVENTOR.

3,229,532
FREE GYRO FITTED WITH TWO-AXIS AND
PRESET CAGING MECHANISM
Donald G. Langley, Maplewood, N.J., assignor to General
Precision, Inc., Little Falls, N.J., a corporation of
Delaware
Filed Jan. 18, 1960, Ser. No. 3,100
13 Claims. (Cl. 74—5.1)

This invention relates to gyros used in navigation systems and is particularly directed to a caging mechanism such as is commonly incorporated in conjunction with a free gyro, or a gyro in which both of the gimbals are intended to be unrestrained in rotation about their axes, such gyros being used in the navigation systems of high speed airplanes, guided missiles and the like.

In guided missiles and similar devices in which a gyro controlled mechanism is used as a means of providing an angular reference, on the basis of which the direction followed by the missile in flight is controlled, it is essential that before the start of the operation of the missile, the gyro be caged, that is that all of the gimbals of the gyro be captured on their axes of rotation in such a manner as to provide angular references of known relationship to the gyro frame. The latter, by its rigid attachment to the vehicle frame, then relates the known angular attitudes of the caged gyro axes to the known attitude prior to launching, so as to provide suitable initial references for subsequent navigation of the missile in flight.

While caging mechanisms of various types are available for gyros of this general type, they are generally relatively bulky, complex, or require an undue amount of time before the gyro is fixedly caged.

In some caging means of this general type, the caging mechanism is quite complex and not particularly positive in its action.

In the caging mechanism for gyros used in some guided missile applications, it is vitally important that the caging means, once it is moved into its caging or locking position, be positive in its function, so that the gyro gimbals are positively held in place in order to enable them to withstand severe shock loads, and relatively high degrees of acceleration while the gyro is in the caged position.

It is also essential that the caging mechanism be simple, compact and of suitably light weight, so that the weight and volume added to the gyro by the caging mechanism be reduced to a minimum.

It is also essential that the time required for rotating each of the gimbals of the gyro into its caged position be held to a minimum, as the time available for this operation may be extremely limited in an apparatus of this type.

It is also essential in a caging apparatus of this type, that the release mechanism provided for releasing the gyro gimbals after they are caged, operate in an extremely short time interval, and with utmost reliability under wide temperature extremes, as guided missiles are operated at extremely high speeds, of the order of two or three times the speed of sound, and are accelerated to these extreme speeds in a relatively short time interval.

A primary feature of the invention is that the caging mechanism is simple, compact, of light weight, and the individual parts thereof are small and compact, so that the device can be utilized with small gyro mechanisms of the type used in conjunction with guided missiles and the like.

Another feature of the apparatus is that each of the gimbals of the gyro is automatically and individually rotated from any random angular position and attitude existing at the start of the caging operation, to the position required for caging or locking the individual gimbal, the locking element being automatically and positively inserted into its mating locking component when the gimbal reaches the required position relative to the locking or caging element.

Another feature of the apparatus is that after the first gimbal is locked in its caged position, the mechanism for rotating the second gimbal into its caging or locking position relative to the caging means is ready for operation, so that it can rapidly and accurately be rotated into its caging position, the locking means automatically engaging when the required caging position is reached.

Another feature of the construction is that the locking means provided is rapid and positive in its operation, so that the overall time required for caging both the gimbals of the gyro is reduced to a minimum.

Another feature of the construction is that the various latching elements and the parts used in conjunction therewith, to latch the gyro gimbals in their caged positions, are held to close tolerances and fitted accurately, so that there is very little play when the gyro is in its fully caged position.

Another feature of the construction, which adds to the accuracy of location of the gimbals in their caged positions, is the utilization of relatively large locking radii for the caging of both axes, the actual locking location for each axis being situated on a surface of revolution which is close to the maximum clearance diameter utilizeable for each axis.

Another feature of the construction is that the locking members of both axes disengage during the uncaging operation, both simultaneously and in a true radial direction with respect to each axis, thereby imposing a minimum of transient precessional torque to displace the gimbals from the caged or reference position of the operating gyro.

Another feature of the invention is that the caging mechanism is so constructed that it will withstand extremely low, as well as relatively high operating temperatures, so that it can operate successfully under all types of weather and climatic conditions, and will also therefore withstand the operating temperatures encountered in the interior of a guided missile without impairing the operating efficiency of the caging mechanism, or of the gyro with which it is used.

Another feature of the construction relates to the release to both gimbals from their caged positions in a minimum of time, the mechanism being so constructed that by virtue of relatively short mechanically interlocked angular or linear motions, the individual caging elements are simultaneously, rapidly and positively released upon command, thus completely restoring the gyro to its free rotation about the axes of the gimbals in a minimum of time.

Another feature of the construction is that upon caging command, the gimbals of the gyro are individually, automatically, and smoothly rotated at a constant rate into their caging positions, independently of gyroscopic torque reactions due to angular momentum of the gyro motor. Violent oscillations of the gimbals, stalling of the caging motor drive, or precessing into the attitude commonly known as "gimbal lock" are not associated with the caging function.

Another feature of the construction is that a minimum torque is required to accomplish the driving of each gimbal to its caged position, since restraint or braking torque is automatically applied to the axis not being driven, such that gyroscopic rigidity of the plane is effectively nullified during caging of each axis in turn. The caging motor therefore requires a minimum of power due to its operation at virtually no load.

Another feature of the construction is that the mechanism provided for rotating the second or outer gimbal into the caging position and locking it, cannot be brought into play until the first or inner gimbal is rotated into its required position and locked, thus assuring that the inner gimbal is positively rotated into its locking position and positively locked before the outer gimbal is rotated into its caging position, and latched in that position.

Another feature of the construction is that all of the fundamental mechanism elements utilized for rotating the inner gimbal into its caged position, and positively locking the inner gimbal, are also utilized in rotating the outer gimbal into its caged position, thereby reducing the number of parts required and the overall weight and size of the assembled gyro to a minimum.

Another feature of the invention is that the caging mechanism is entirely automatic in its operation, after the operation thereof is initiated by the operator of the airplane, or other type of vehicle in which the gyro is mounted, electro-mechanical and electronic control devices being provided to control and actuate the various caging elements of the apparatus.

Another feature of a modification of the construction is that the outer gimbal of the gyro can be caged at any preset or predetermined rotational angular position about the outer axis of the gyro, the angular position being relatively closely held, or continuously variable and closely controlled so as to assure accurate caging at the angular position required at any instant, by certain types of remotely located or associated command circuitry.

A feature of one modification of the caging mechanism is that completely mechanical means is provided for automatically arresting the rotation of the outer gimbal during the caging of the inner gimbal, the arresting means being utilized to restrain the outer gimbal at a point close to whatever random angular position it may have assumed prior to the initiation of the caging function.

A feature of the above modified construction is that a portion of the latching means for the outer axis is utilized for braking the rotation of the outer gimbal, while the inner gimbal is being caged, the latching element entering into one of a plurality of slots provided in the braking portion of a combination braking and latching assembly which is attached to the outer gimbal of the gyro.

A feature of another modification of the construction is that a single electromechanical unit is provided to accomplish the functions of locking the entire mechanism in the uncaged condition, releasing it to initiate caging, and providing for preliminary braking of the outer gimbal of the gyro, coordinated with the caging of the inner gimbal and the various positions of the inner axis caging means.

Another feature of the general construction is that provision is made for automatically releasing the preliminary outer axis braking means, when the inner gimbal becomes fully latched, so that the outer gimbal is completely free to be driven to the desired outer axis caging position.

A primary feature of the various modifications of the construction is that they may be adapted for use in conjunction with a wide variety of types and sizes of gyro, the essential features of the construction remaining substantially the same, provision being made for adapting the various elements of the modifications to suit the requirements of a particular size and type of gyro, and of a particular application or environment in which the gyro to be used.

The accompanying drawings, illustrative of one embodiment of the invention and several modifications thereof, together with the description of their construction and the method of adjustment, operation, actuation and utilization thereof, will serve to clarify further objects and advantages of the invention.

In the drawings:

FIGURE 1 is a longitudinal section through the free gyro assembly shown in FIGURE 2, showing the outer gimbal, the inner caging ring which surrounds and is fixedly attached to the inner gimbal, the caging spindle used in conjunction with the inner caging ring, the braking wheel having a plurality of radially positioned braking grooves around the outer circumference thereof, the braking wheel being attached to the outer gimbal, the pivoted control lever used for controlling the reciprocating movement of the caging spindle, also the solenoids used to control the operation of the pivoted control lever and the braking wheel, the locking lever used for locking the outer gimbal, and the slot through the annular ring portion of the braking wheel into which the free end of the latching leg of the locking lever is fitted to lock the outer gimbal, the locking lever being shown in the free position, also a plurality of micro-switches actuated by the pivoted control lever and the locking lever, respectively, the section being taken on the line 1—1, FIGURE 2.

FIGURE 2 is an end elevational view and partial vertical section through the gyro assembly shown in FIGURE 1, the upper part showing the assembled unit with the cover removed, showing the bracket which supports the braking wheel locking lever, also showing the rotary solenoid, which is used for controlling the angular movement of the pivoted control lever, shown in FIGURE 1, the lower part of FIGURE 2 showing the outer gimbal of the gyro, and the braking wheel used in conjunction therewith, the view being taken on the line 2—2, FIGURE 1.

FIGURE 3 is an exploded modified perspective view of the inner axis caging ring shown in FIGURE 1, showing the rails surrounding the inner axis caging ring, also the caging spindle mounted adjacent the inner axis caging ring, for rotating and locking the inner axis caging ring, shown in FIGURE 1, the cylindrical portion of the head of the caging spindle being shown in alignment with a mating opening, or recess through the inner axis caging ring.

FIGURE 4 is a section through a portion of the inner axis caging ring, shown in FIGURE 3, showing the pin with a projecting head attached to the inner axis caging ring, the projecting head of the pin being utilized to rotate the inner axis caging ring about the outer axis of the gyro, which is co-axial with the longitudinal axis through the caging spindle, the projecting head of the pin fitting through one of the radially positioned slots through the flange of the head of the caging spindle, shown in FIGURE 3, the section being taken on the line 4—4, FIGURE 3.

FIGURE 5 is a side elevational view of the locking lever support bracket, shown in FIGURES 1 and 2, and the locking lever used for latching the braking wheel and the gyro outer gimbal, the locking lever being pivotally supported by the bracket, as shown in FIGURE 1, the view being taken on the line 5—5, FIGURE 6.

FIGURE 6 is a vertical section through the locking lever support bracket, shown in FIGURES 2 and 5, and the braking wheel and gyro outer gimbal locking lever pivotally supported thereby, also showing a portion of the spindle drive gear attached to the caging spindle, which controls the angular position of the locking lever, the section being taken on the line 6—6, FIGURE 5.

Figure 3:
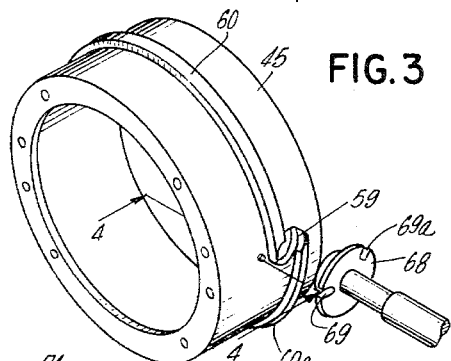

FIGURE 7 is a schematic partial longitudinal section and partial front elevation of the inner axis caging ring shown in FIGURE 3, and the head of the caging spindle used in conjunction therewith, showing the direction of rotation of the caging spindle stem, in order to rotate the inner axis caging ring into a position in which the caging recess of the inner axis caging ring is in alignment with the longitudinal axis of the head of the caging spindle.

FIGURE 8 is a schematic plan view and partial section through the inner axis caging ring shown in FIGURES 3 and 7, and the head of the caging spindle used in conjunction therewith, showing by arrows the direction of rotation of the caging spindle and the rotational angular movement of the inner axis caging ring, relative to the caging spindle axis, in order to bring the caging recess of the inner axis caging ring into radial alignment with the cylindrical portion of the head of the caging spindle.

FIGURE 9 is a schematic partial longitudinal section and partial front elevational view of the inner axis caging ring and the caging spindle, shown in FIGURES 7 and 8, with the inner axis caging ring rotated into a position in which the cylindrical pilot section of the head of the caging spindle through which the radially positioned slots are cut is clear of the projecting head of the pin attached to the innner axis caging ring.

FIGURE 10 is a schematic partial longitudinal section and partial front elevation, similar to FIGURES 7 and 9, through the inner axis caging ring and the caging spindle assembly, with the projecting head of the drive pin of the inner axis caging ring in alignment with one of the radially positioned slots through the flange of the caging spindle, the spindle head having been moved into a position in which one of the slots through the spindle head flange straddles the projecting head of the drive pin of the inner axis caging ring, thus enabling the caging spindle to more positively rotate the inner axis caging ring and the outer gimbal about the outer gimbal pivot axis.

Figure 1:
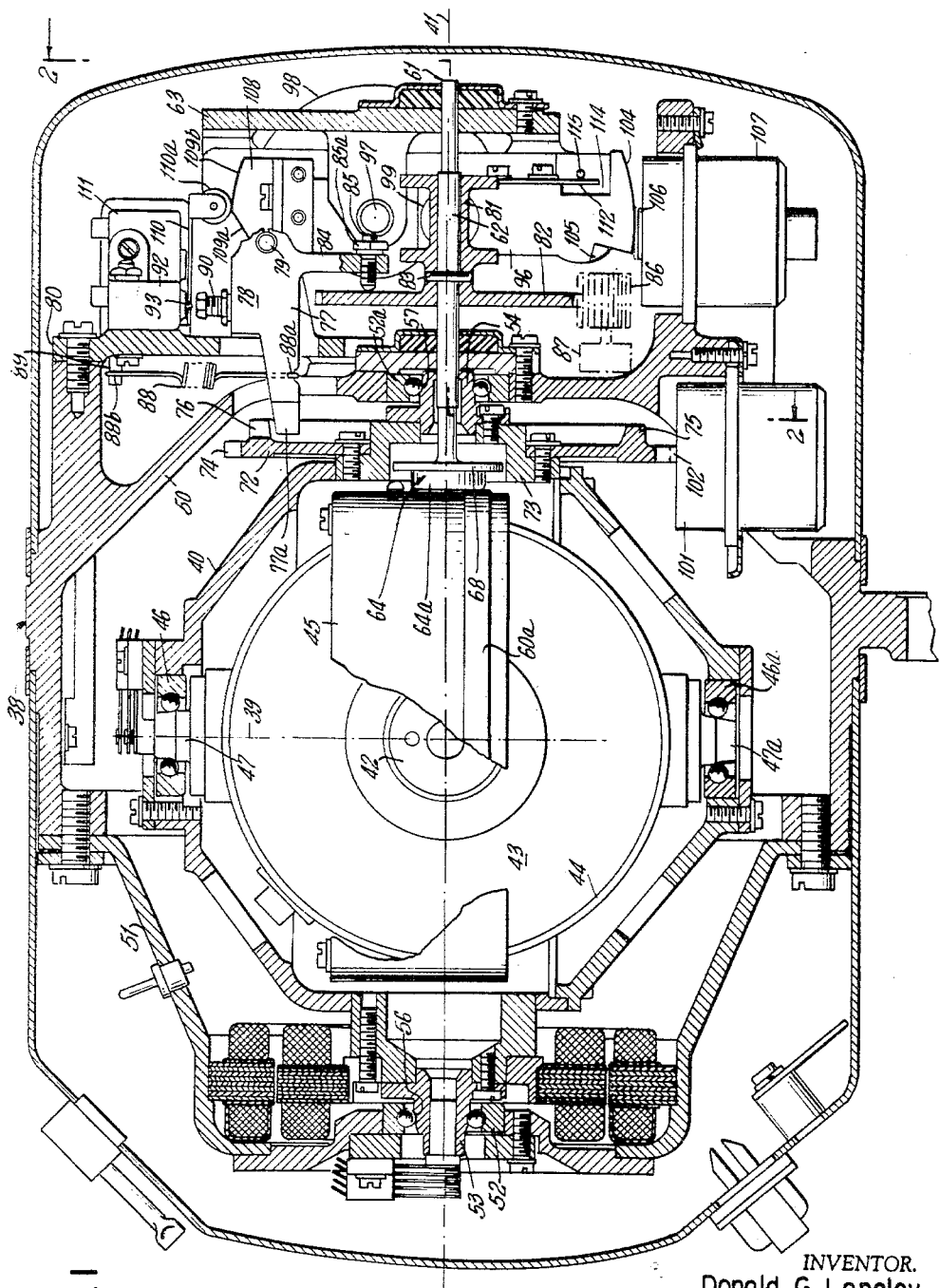

FIGURE 11 is a schematic longitudinal section, through a portion of the caging mechanism shown in FIGURE 1, showing the pivoted control lever and the caging spindle in the uncaged position, the plunger of the uncage locking solenoid being shown in the de-energized position, in engagement with the notched end of the pivoted control lever, the pivoted locking lever and the plunger of the outer axis braking solenoid used in conjunction with the braking wheel shown in FIGURE 1, being shown in their uncaged position free of the braking wheel, the outer axis braking solenoid being de-energized. The microswitch located at the short upper end of the control lever, which is controlled by the cam attached to the end of the control lever being shown in the activated position, the other microswitch at the upper end of the control lever, which is controlled by the latching leg of the pivoted locking lever being shown in the free position, the plunger of the mircoswitch being free of the actuator screw attached to the latching leg of the locking lever.

FIGURE 12 is a schematic longitudinal section, similar to FIGURE 11, through a portion of the caging mechanism shown in FIGURE 1, showing the pivoted control lever and the caging spindle in the fully caged position, with the cylindrical pilot section of the head of the caging spindle inserted through the opening or recess through the inner axis caging ring, the plunger of the uncage locking solenoid being shown in the de-energized position, in engagement with the arcuate lower end of the control lever, the plunger of the outer axis braking solenoid used in conjunction with the braking wheel also being shown in the de-energized position, the end of the plunger being clear of the outer circumference of the braking wheel, the outer end of the latching leg of the locking lever being fitted to the slot through the rim of the braking wheel, the projecting actuating screw attached to the latching leg of the pivoted locking lever being shown moved into a position in which the plunger of one of the microswitches which is located adjacent the upper or cam end of the control lever, is moved inward toward the case of the microswitch into the activated position, the other microswitch which is located adjacent the cam end of the control lever, and is controlled by the cam at the upper end of the pivoted control lever, having been moved into the free position, the actuator roller of the microswitch being free of the upper cam attached to the control lever.

FIGURE 12a is a schematic side elevational view of the two microswitches located adjacent the cam end of the control lever shown in FIGURES 1, 11 and 12.

FIGURE 12b is a schematic side elevational view of the actuator spring-controlled microswitch located adjacent the lower end of the control lever and shown in FIGURES 1, 11, 12 and 16, showing the actuator arm of the microswitch and the formed plate spring attached to the case of the microswitch which engages the actuator arm of the microswitch.

Figure 2:
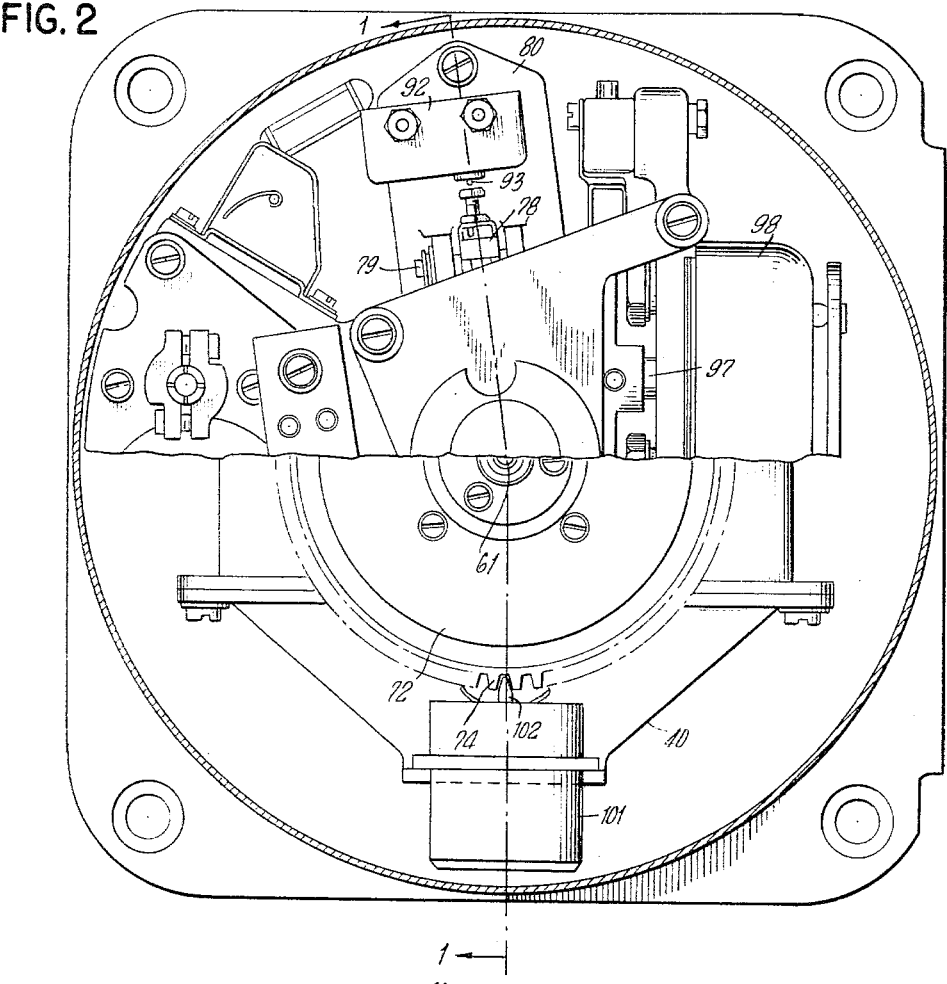

FIGURE 13 is a longitudinal section, similar to FIGURE 1, through a modification of the gyro assembly shown in FIGURES 1 and 2, showing the outer gimbal with the outer axis locking lever shown in FIGURES 1, 5 and 6 eliminated, so that the outer gimbal of the gyro may be preset or arrested at any desired angular position about the outer axis of rotation thereof, the inner axis caging ring which surrounds the inner gimbal, and the caging spindle used in conjunction therewith, which are substantially the same as those shown in FIGURES 1 and 2, being shown in the caging position, the cylindrical head of the caging spindle being in engagement with one of the rim rails surrounding the inner axis caging ring, thus enabling the inner axis caging ring to be rotated into its caging position, also showing the relation between the actuator roller of one of the microswitches mounted at the upper or cam end of the control lever, and one of the cams attached to the upper end of the pivoted control lever, and in addition showing the relationship between the plunger of the uncage locking solenoid being shown in the energized position, out of engagement with the arcuate lower end of the pivoted control lever, and the plunger of the braking solenoid being shown in the energized position in engagement with and arresting rotation of the braking wheel, also showing in dot-dash lines the motor and the caging pinion driven thereby, which are utilized to rotate a gear attached to the caging spindle in order to rotate the outer gimbal into any arbitrary preset caging position.

FIGURE 14 is a schematic longitudinal section, similar to FIGURE 11, through a portion of the modified caging mechanism, shown in FIGURE 13, showing the pivoted control lever and the caging spindle in the uncaged position relative to the inner axis caging ring, the head of the caging spindle being completely free of the rim rails surrounding the inner axis caging ring, the plunger of the uncage locking solenoid being shown in the de-energized position, in engagement with the notched end of the pivoted control lever, the actuator roller of one of the microswitches located at the cam end of the control lever being shown moved toward the case of the microswitch into the activated position, the actuator spring at the other end of the control lever moving the actuator arm thereof away from the case of the microswitch, thereby moving the microswitch plunger into the free position.

FIGURE 14a is a schematic end elevational view of a portion of the modified caging mechanism shown in FIGURE 13, showing a portion of the pivoted control lever, with a pair of cams attached thereto, and the two microswitches, with the actuator rollers attached thereto, the actuator rollers being controlled by the cams attached to the pivoted control lever.

FIGURE 15 is a schematic longitudinal section, similar to FIGURE 14, through a portion of the preset caging mechanism shown in FIGURE 13, showing the pivoted control lever and the caging spindle being fitted through the caging opening or recess through the inner axis caging ring, the plunger of the uncage locking solenoid being shown in the de-energized position in engagement with the arcuate outer end of the pivoted control lever, the plunger of the braking solenoid being shown in the de-energized position disengaged from the braking wheel, the actuator roller of the microswitch located at the cam end of the pivoted control lever being shown in the free position, the plunger of the microswitch being in the free or unactivated position, the actuator arm of the microswitch, which is controlled by an actuator spring attached to the lower end of the pivoted control lever also being in the free position, out of engagement with the actuator spring.

FIGURE 16 is a schematic partial cross-section and partial side elevational view of the lower end of the pivoted control lever shown in FIGURE 13, and the microswitch actuated thereby, showing the microswitch actuator spring attached to the pivoted control lever, the spring actuator arm of the microswitch in engagement with it, the formed plate spring attached to the case of the microswitch which presses the actuator arm of the microswitch against the actuator spring, the plunger of the microswitch being in the free or open position, the section and view being taken on the line 16—16, FIGURE 14.

Figure 17:
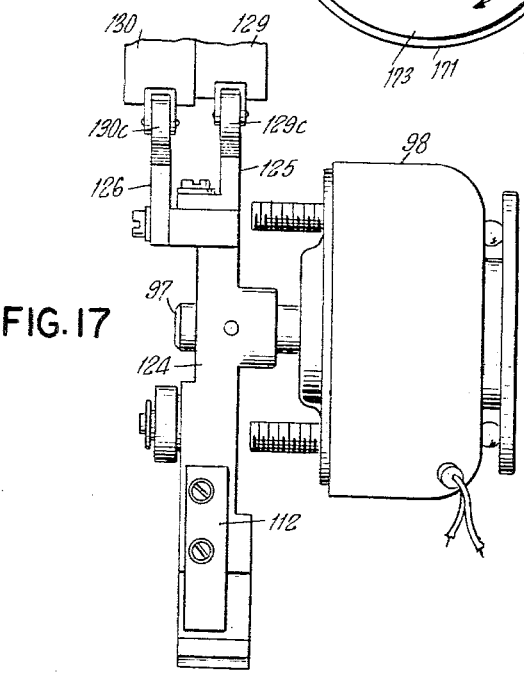

FIGURE 17 is a side elevational view of the rotary solenoid assembly shown in FIGURES 13, 14 and 15, which is used for uncaging the inner axis caging ring, in the preset construction, with the pivoted control lever, attached to the rotatable shaft of the rotary solenoid. The cams mounted at the upper end of the pivoted control lever are used in conjunction with the preset construction shown in FIGURE 13, the cams being operative to independently control the movement of the actuating rollers of two individual microswitches in the manner shown in FIGURES 14, 14a and 15.

FIGURE 18 is a front elevational view of the rotary solenoid and the pivoted control lever assembly shown in FIGURE 17, with the pivoted control lever fixedly attached to the rotatable shaft of the rotary solenoid, the upper end of the pivoted control lever having a pair of cams attached thereto, for individually controlling the actuating rollers of a pair of microswitches, such as those shown in FIGURES 13, 14a and 17, the cams and the actuating rollers they engage being shown in their operative relation in FIGURE 17.

FIGURE 19 is a side elevational view, similar to FIGURE 17, of the upper or cam portion of a modification of the pivoted control lever shown in FIGURE 17, the pivoted control lever, which is attached to the shaft of a rotary solenoid, shown in FIGURE 17, being fitted with a single cam for operation in conjunction with the actuating roller of a single microswitch, which is used in the operation of the two-axis caging mechanism shown in FIGURE 1.

FIGURE 20 is a front elevational view, similar to FIGURE 18, of the upper or cam end of the modified pivoted control lever assembly shown in FIGURE 19, which is attached to a rotary solenoid, shown in FIGURES 17 and 18, the control lever being fitted with a single control cam for use in conjunction with a single microswitch actuator roller in the two-axis caging mechanism, as shown in FIGURE 19.

Figure 21:
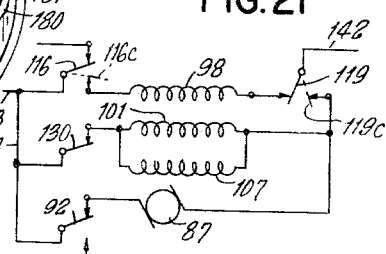

FIGURE 21 is a schematic wiring diagram of the two-axis caging circuit used in conjunction with the caging mechanism shown in FIGURES 1, 11 and 12, with the caging mechanism and the control switches and microswitches therefor, shown in the uncaged position.

Figure 22:
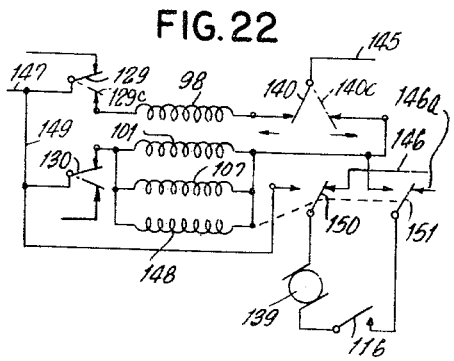

FIGURE 22 is a schematic wiring diagram, similar to FIGURE 21, of the preset caging circuit, used in conjunction with the modified or preset caging mechanism shown in FIGURES 13, 14 and 15, with the caging mechanism and the control switches and microswitches used in conjunction therewith, shown in the uncaged position.

FIGURE 23 is a schematic longitudinal section, similar to FIGURES 11 and 12, through a portion of the caging mechanism of the two-axis caging unit and a modification of the outer axis braking and caging mechanism shown in FIGURES 1 and 2, showing the auxiliary cupped and slotted ring which is used for mechanically arresting the rotation of the outer gimbal in one of a series of angular positions around the outer pivot axis, the pivoted braking lever, which is similar to that shown in FIGURES 1, 11 and 12, being shown in the free position similar to that shown in FIGURE 11, with the latching leg thereof angularly positioned and free of the slots through the rim of the auxiliary cupped slotted ring, the caging spindle, which controls the angular movement of the pivoted braking lever being moved rightward, to the position shown in FIGURE 23, with the head of the caging spindle free of the rim rails surrounding the inner axis caging ring, the pivoted control lever being similarly moved angularly rightward, the notched end of the pivoted control lever being in engagement with the outer end of the plunger of the uncage locking solenoid, which is in the de-energized position, similar to that shown in FIGURE 11.

FIGURE 24 is a schematic longitudinal section, similar to FIGURE 23, through a portion of the caging mechanism and the modified outer axis braking mechanism shown in FIGURE 23, showing the latching leg of the locking lever in the intermediate or braking position, in engagement with one of the slots through the rim of the auxiliary cupped slotted ring, shown in FIGURE 23, the caging spindle which controls the movement of the braking lever, in the manner shown in FIGURE 1, being shown in the caging position, the outer surface of the head thereof being in engagement with one of the circumferential rim rails around the inner axis caging ring, also showing the latching leg of the braking lever moved angularly downward to an intermediate arresting position, in which the latching leg of the braking lever is in engagement with the inner edge of the circular rim of the auxiliary cupped slotted ring, which is shown in FIGURE 23, between the slots therethrough, the pivoted braking lever being shown in dot-dash lines, the plunger of the uncage locking solenoid being in the energized position, out of engagement with the arcuate lower end of the pivoted control lever, the caging spindle being shown moved rightward to the free position, with the pivoted control lever correspondingly moved angularly rightward, shown in dot-dash lines, the plunger of the uncage locking solenoid being moved upward to the de-energized position in engagement with the arcuate lower end of the pivoted control lever, in dot-dash lines.

FIGURE 24a is a schematic side elevational view of the two microswitches located adjacent the cam end of the pivoted control lever shown in FIGURES 23 and 24, showing the actuator arms and the actuator rollers attached to the two microswitches.

FIGURE 25 is a schematic longitudinal section, similar to FIGURES 23 and 24, through the inner axis caging mechanism, and the modified outer axis braking mechanism shown in FIGURES 23 and 24, showing the latching leg of the braking lever in the locking position, in engagement with the slot through the outer rim of the braking wheel, similar to that shown in FIGURE 12, also showing the latching leg of the braking lever moved angularly downward to the intermediate braking position, the outer edge of the latching leg being in engagement with the inner edge of the rim of the braking wheel, shown in dot-dash lines, the caging spindle, which controls the angular movement of the braking lever being shown in the fully caged position, with the cylindrical portion of the head thereof in engagement with the opening or recess through the inner axis caging ring, the plunger of the uncage locking solenoid being in the de-energized position, in engagement with the arcuate lower end of the pivoted control lever, the caging spindle and the pivoted control lever being moved to an intermediate position, between that shown by solid lines in FIGURE 25 and the solid line caging position, shown in FIGURE 24, in order to control the movement of the pivoted braking lever to the angular position shown by dot-dash lines, in FIGURE 25.

FIGURE 26 is a schematic side elevational view and partial cross-section through the pivoted braking lever of the modified outer axis braking mechanism shown in FIGURES 23, 24 and 25, showing the slot through the rim of the braking wheel moved angularly leftward to a position out of alignment with the latching leg of the pivoted braking lever, the latching leg of the braking lever being in an intermediate or preset braking position, similar to that shown in FIGURE 24, the latching leg being fitted through one of the radially positioned slots through the rim of the auxiliary cupped slotted ring, the latching leg of the braking lever being shown and moved angularly downward to the arresting position shown in dot-dash lines, FIGURE 24, with the outer surface of the latching leg of the braking lever in engagement with the inner edge of the rim of the auxiliary cupped ring, the latching leg of the braking lever being shown in dash lines, the latching leg of the braking lever also being shown moved to the uncaged position, similar to that shown in FIGURE 23, with the latching leg of the braking lever completely free of the rim of the auxiliary cupped slotted ring, the latching leg being shown in dot-dash lines.

FIGURE 27 is a schematic side elevation and partial section, similar to FIGURE 26, through the latching leg of the pivoted braking lever of the modified outer axis braking mechanism shown in FIGURES 23, 24 and 25, showing the slotted rim of the braking wheel, and the rim of the auxiliary cupped slotted ring, which is shown in FIGURES 23, 24 and 25, with the latching leg of the braking lever shown in the outer axis locking position in engagement with the slot through the outer rim of the braking wheel, similar to that shown in FIGURE 25, the latching leg of the braking lever being shown moved angularly toward the spindle axis, to the arresting position, shown in dot-dash lines, FIGURE 25, the outer surface of the latching leg of the braking lever being in engagement with the inner surface of the rim of the braking wheel, the latching leg being shown in dot-dash lines, the wide slot through the rim of the auxiliary cupped ring which is radially aligned with the slot through the rim of the braking wheel being shown aligned with the latching leg of the braking lever.

FIGURE 28 is a schematic end elevational view of the auxiliary cupped slotted braking ring shown in FIGURES 23, 24 and 25, showing the circular rim surrounding the auxiliary cupped slotted ring, the radially positioned slots therethrough, and the enlarged central slot shown in FIGURE 26, which is in radial alignment with the caging slot through the rim of the braking wheel, the wide central slot allowing the latching leg of the braking lever to pass from the uncaged position shown in solid lines, FIGURE 23, to the outer axis fully caged position shown in solid lines, FIGURE 25, the view being taken on the line 28—28, FIGURE 27.

FIGURE 29 is a schematic longitudinal section, similar to FIGURE 23, through the inner axis caging mechanism, and another modification of the outer axis braking mechanism shown in FIGURES 23, 24 and 25, showing an auxiliary rotary solenoid with a circular disc attached to the shaft of the rotary solenoid, the caging spindle being in the uncaged position, free of the rim rails of the inner axis caging ring, the pivoted control lever being similarly moved angularly rightward to a corresponding angular position, the pivoted control lever being latched in the angular right-hand position, by a ledge located at the left-hand edge of the arcuate outer head portion of the pivoted control lever, the ledge engaging the outer circumference of a ball-bearing supported by a pivot pin attached to the substantially circular disc attached to the shaft of the auxiliary rotary solenoid, the circular disc having an angle bracket attached thereto, one leg of the angle bracket having an adjustable locking screw fitted thereto, the locking screw being shown moved to a free position, completely out of engagement with the grooves surrounding the outer circumference of the braking wheel.

Figure 30:
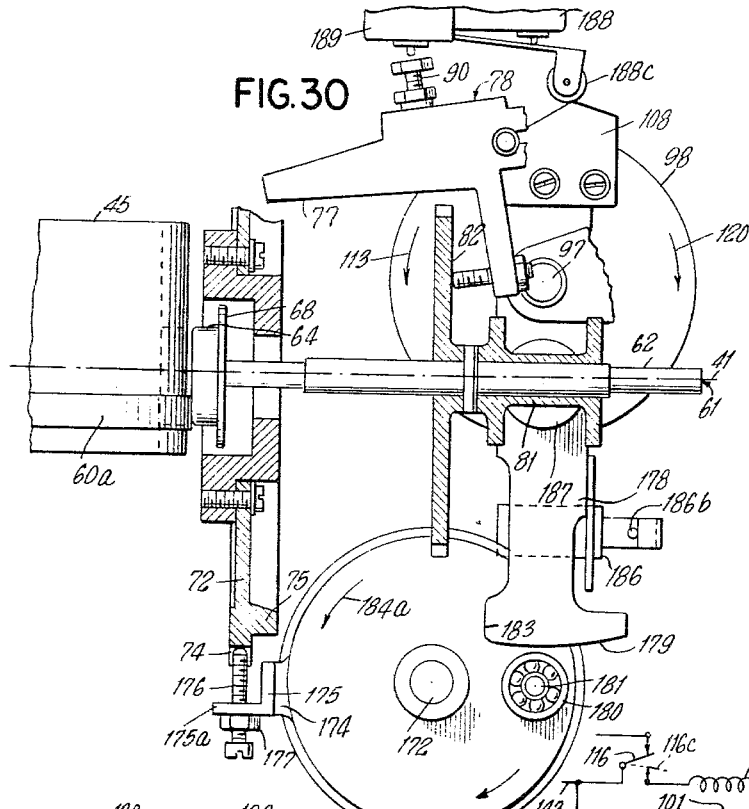

FIGURE 30 is a schematic longitudinal section, similar to FIGURE 29, through the inner axis caging mechanism, and the modification of the outer axis braking mechanism shown in FIGURE 29, an auxiliary rotary solenoid being provided with a disc attached to the central shaft of the rotary solenoid, the caging spindle being shown in the inner axis caging position, with the bottom surface of the cylindrical head thereof in engagement with one of the rim rails surrounding the inner axis caging ring, the braking screw threadably fitted to a bracket located at the circumferential lower end of the disc attached to the rotary solenoid being shown in engagement with one of the grooves surrounding the braking wheel, the ball bearing trunnioned on a pin attached to the circular disc being free of the arcuate lower edge of the pivoted control lever, the auxiliary rotary solenoid being energized.

FIGURE 31 is a schematic longitudinal section through the modified outer axis braking mechanism, shown in FIGURES 29 and 30, showing the caging spindle in the fully caged position, with the head thereof fitted to the recess through the inner axis caging ring, the control lever having been moved to a similar position, the auxiliary rotary solenoid being de-energized, the return spring of the rotary solenoid rotating the disc attached to the shaft thereof, so that the locking screw fitted to the angle bracket attached to the circular disc is moved completely clear of the grooves around the outer circumference of the braking wheel, the ball bearing supported by the circular disc being simultaneously moved into a position in which the outer race thereof is in engagement with the arcuate lower end of the control lever, thereby limiting the angular movement of the circular disc and the locking screw supported thereby in one direction.

Figure 32:
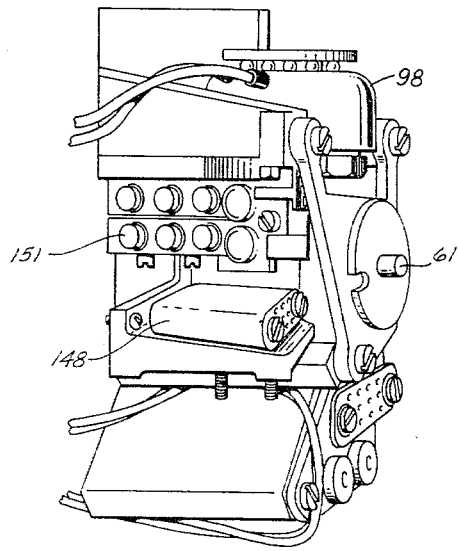

FIGURE 32 is a schematic side elevational view of a portion of the modified gyro and caging mechanism combination shown in FIGURE 13, and schematically in FIGURES 14 and 15, the outer gimbal of the gyro being adapted for preset operation, showing the relay which is substituted for the locking lever assembly shown in FIGURES 5 and 6, the relay being employed for the preset outer axis caging operation.

It will be understood that the following description of the construction, operation and the method of control and utilization of the "Inner and Outer Axis Caging Mechanism for a Free Gyro" is intended as explanatory of the invention and not restrictive thereof.

In the drawings, the same reference numerals designate the same parts throughout the various views, except where otherwise indicated.

One embodiment of the gyro mechanism shown in FIGURES 1 and 2 is supported by a case 38, in which a free gyro, which is rotatably supported on two axes, an inner axis 39, on which the inner gimbal and the gimbal rotor are rotated, the inner axis being centered in the outer gimbal 40, the outer gimbal being rotatable about the outer axis 41, which is the horizontal axis shown in FIGURE 1.

The gyro rotor 42, which is driven by a central motor 43, is rotatably supported by a tubular inner axis caging ring, as shown in FIGURE 1.

The inner gimbal 44 and the inner axis caging ring 45 are trunnioned in the outer gimbal 40, by a pair of anti-friction bearings 46, 46a, which are fitted to the outer gimbal, a pair of stub shafts 47, 47a attached to the inner gimbal 44 being fitted to the balls in the interior of the anti-friction bearings 46, 46a.

The outer gimbal 40 is trunnioned in the main or right-hand section 50, and the auxiliary or left-hand section 51 of the case by a pair of anti-friction bearings 52, 52a, as shown in FIGURE 1, an extension stub shaft 53, and a mating tubular extension stub shaft 54, located at the right-hand end of the outer gimbal, being fitted to and supported by a row of balls at the center of each bearing, each of the stub shafts 53, 54 having an angular contact groove 56, 57, of circular segmental cross-section formed therearound, the angular contact grooves 56, 57 absorbing the radial loads, and a major portion of the thrust loads of the outer gimbal 40.

The inner axis caging ring 45, which is shown in FIGURES 1 and 3, comprises a tubular shell having an elongate substantially circular opening, or recess 59 therethrough, as shown in detail in FIGURE 3, and has a pair of rim rails 60, 60a, of a diameter somewhat greater than that of the annular wall of the inner caging ring, the rim rails 60, 60a being located on opposite sides of the caging opening or recess 59, the caging opening or recess 59 and the rim rails 60, 60a being utilized for caging the inner axis caging ring in a manner hereinafter described in greater detail.

A caging spindle 61 is supported on the outer axis 41, horizontal axis, FIGURE 1, of the gyro assembly, the caging spindle consisting of a spindle shaft 62, which is rotatably and slidably supported by a bracket 63, which is attached to the right-hand section 50 of the case, the inner end of the spindle shaft, with which the head 64 of the spindle is integral, being supported by the right-hand hub 66 of the outer gimbal by a plurality of screws, or other suitable attaching means.

The head 64 of the caging spindle 61 comprises a cupped cylindrical body 64a, with a circular flange 68, integral with the outer end of the cylindrical body, the circular flange 68 having a plurality of equally-spaced, radially positioned slots 69, 69a therethrough, which are utilized for caging the gyro on the outer axis thereof, in a manner hereinafter described.

The cylindrical body 64a of the head of the caging spindle is operative to fit into the circular recess 59 through the annular outer wall of the inner axis caging ring 45 in a manner shown schematically in FIGURE 3, and hereinafter described in greater detail.

Figure 4:

As shown in FIGURES 3 and 4, the inner axis caging ring 45 has a pin 70, fixedly attached thereto, the pin having a projecting frusto-conical head 71 integral therewith, the projecting head 71 of the pin being operative to selectively fit through one of the radially positioned slots 69, 69a through the flange of the caging spindle 61, to cage the inner caging ring and the gyro outer gimbal 40 about the outer axis 41 of the gyro in a manner hereinafter described in greater detail.

The braking wheel 72, shown in FIGURES 1 and 31, is attached to a circular hub 73, which is in turn attached to the right-hand wall of the outer gimbal 40 by a plurality of screws, or other suitable attaching means, the braking wheel being utilized for braking and arresting the rotation of the gyro about the outer axis 41 thereof, and for latching the gyro about its outer axis 41, in a manner hereinafter described in greater detail.

The braking wheel 72 comprises a substantially circular body having a plurality of radially positioned circumferential teeth 74, around the outer circumference thereof, the circumferential teeth having equally-spaced grooves of arcuate contour therebetween, with a substantially circular rim 75, integral with the body of the braking wheel and extending outward, righthand, FIGURE 1, substantially perpendicularly to the body of the braking wheel in the manner shown in FIGURES 12 and 31. The circular rim 75 of the braking wheel has a slot 76 of rectangular cross-section therethrough, the slot 76 being operative to receive the tip 77a of the latching leg 77, of a pivoted locking lever 78 in the manner shown in FIGURE 1, to lock the braking wheel and the outer gimbal of the gyro, in the manner shown in FIGURES 1 and 12 and hereinafter described.

As shown in FIGURES 1, 5 and 6, the locking lever 78 is pivotally supported by a pin 79, which is supported by a bracket 80 attached to the right-hand section 50 of the case 38. The latching leg 77 of the braking lever has an extension 77a, of substantially rectangular cross-section integral with the extreme outer end thereof, the width of the extension 77a being slightly less than the width of the slot 76 through the rim of the braking wheel, thus enabling the extension of the latching leg to lock the braking wheel in the caging position.

As shown in FIGURE 1, a tubular sleeve 81 having a large spur gear 82, integral with the left-hand end thereof, is fitted to the shaft of the caging spindle, the tubular sleeve being attached to the shaft of the caging spindle by means of a cylindrical pin 83, or other suitable attaching means.

An arm 84 is integral with the locking lever 78, the arm being substantially perpendicular to the latching leg 77 of the locking lever. An adjusting screw 85 is threadably fitted to the arm 84 of the latching lever, the tip of the adjusting screw 85 being held in engagement with the face of the spur gear 82, thereby co-ordinating the angular position of the latching leg 77 of the locking lever with the longitudinal position of the caging spindle 61. A lock nut 85a is threadably fitted to the adjusting screw 85, in order to retain the adjusting screw in its adjusted position relative to the spur gear 82.

The caging spindle is rotated by the spur gear 82 which is attached to the shaft 62 of the caging spindle, a pinion 86 which is driven by a motor and reduction gear mechanism 87, shown in dot-dash lines, FIGURE 1, being utilized to rotate the pinion 86 and therefore the caging spindle gear 82, in order to rotate the flange 68 of the caging spindle into the caging position, the method of controlling the outer axis caging motor being hereinafter described in greater detail.

When the slot 76, through the rim of the braking wheel 72 is in line with the extension 77a of the latching leg 77 of the latching lever, a coiled tension spring 88, one looped end 88a of which is attached to the latching leg 77 of the locking lever, with the opposite looped end 88b of the tension spring attached to a projecting lug 89 of the right-hand section 50 of the case 38, is provided to draw the extension of the latching leg 77 of the latching lever into the slot 76, through the rim of the braking wheel, thereby retaining the braking wheel 72 and the outer gimbal 40 of the gyro, to which it is attached, in the latching or caging position, in the manner shown schematically in FIGURES 11 and 12, and hereinafter described in greater detail.

A switch actuator screw 90 is threadably attached to the latching leg of the latching lever, the screw having a lock nut threadably attached thereto.

A microswitch 92 having a reciprocating plunger 93 fitted thereto is attached to bracket 80, which is attached to the case section 50, the plunger 93 being in substantial alignment with the actuator screw 90 attached to the latching leg 77 of the locking lever, the locking lever 78 being operative to move the plunger 93 of the microswitch 92 into the activated position, when the latching leg of the locking lever is in the latching position shown schematically in FIGURE 12, and hereinafter described in greater detail.

A control lever 96, which is attached to the rotating central shaft 97 of a rotary solenoid 98, is utilized to adjust the longitudinal position of the caging spindle and the head thereof, relative to the inner axis caging ring, through the range of angular positions shown in FIGURES 11 and 12, the control lever being shown in FIGURE 1, the detailed construction of the control lever being shown in FIGURES 17, 18, 19 and 20.

A yoke 99, which is attached to the control lever 96, is slidably fitted to the tubular sleeve 81 which surrounds the shaft 62 of the caging spindle 61, the yoke 99 enabling the center distance between the center of the yoke 99 and the center of the shaft 62 of the rotary solenoid to be varied relative to the distance between the center of the caging spindle shaft 62 and the center of the rotary solenoid, thus allowing the center of the caging spindle shaft to follow a reciprocating path, while the center of the yoke 99 follows an arcuate path about the center of the rotary solenoid 98 as an axis.

In order to arrest the rotation of the outer gimbal 40 about the outer axis 41 of the gyro, an outer axis braking solenoid 101 having a reciprocating plunger 102 fitted thereto is mounted adjacent the outer circumference of the braking wheel 72, in order to enable the plunger 102 of the solenoid to fit into one of the circumferential grooves around the outer circumference of the braking wheel, the plunger being forced toward the outer circumference of the braking wheel 72, when the outer axis caging solenoid 101 is energized in the manner shown schematically in the wiring circuit, FIGURE 22, and hereinafter described in greater detail.

The lower end of the control lever 96 is of circular segmental contour 104 as shown in FIGURES 1 and 18, a notch 105 being cut into the control lever 96 adjacent the arcuate lower end thereof, to enable the control lever to clear the plunger 106 of an uncage locking solenoid 107 located adjacent the arcuate end of the control lever, when the uncage locking solenoid is de-energized in the position shown in FIGURE 11.

When the uncage locking solenoid is de-energized, the plunger 106 thereof is moved outward into engagement with the arcuate outer end of the control lever, when the control lever is in any angular position other than the uncaged position of the caging spindle shown in FIGURE 11, in which position the notched end of the control lever rests against the tip of the reciprocating plunger 106 of the uncage locking solenoid, thus preventing any movement of the caging spindle toward the inner axis locking position shown in FIGURE 12, until the uncage locking solenoid 107 is again energized, thereby withdrawing the plunger 106 from engageemnt with the arcuate lower end of the control lever.

The short end of the control lever 96 has a cam 108 attached thereto, the cam having two sloping cam surfaces 109a, 109b thereon, which are operative to engage the actuator roller 110a which is attached to the actuator arm 110 of a microswitch 111, which is mounted adjacent the cam end of the control lever 96 in substantialy the position shown in FIGURE 1.

The rotary solenoid is rotated in a counterclockwise direction shown by the left-hand arrow 113, FIGURE 11, in order to move the caging spindle into the uncaged position shown in FIGURE 11, the return spring of the rotary solenoid 98 being operative to rotate the shaft thereof in the opposite direction, clockwise, as shown by the right-hand arrow 120, FIGURE 12, in order to move the head 64 of the caging spindle into the fully caged position shown in FIGURE 12, in engagement with the opening or recess 59 through the inner caging ring, as shown in FIGURE 12.

As shown in FIGURES 1, 17 and 18, the long arm of the control lever, has a spring actuator 112 attached thereto, a notch or channel 114 being cut into the outer end of the control lever 96 to clear the free end of the actuator spring 112.

As shown in FIGURE 16, an actuator arm 115 is pivotally attached to a microswitch 116 mounted adjacent the end of the control lever and substantially perpendicular thereto, the hooked outer end 115a of the actuator arm 115 being operative to engage the actuator spring 112 attached to the control lever to enable the actuator arm 115 of the microswitch to move the plunger 116a of the microswitch toward the microswitch case into the activated position when the control lever 96 is moved into the fully caged spindle position shown in FIGURE 12.

A formed spring 117 is attached to the case of the microswitch 116, the tip 117a at the free end of the formed spring 117 being in engagement with the actuator arm 115 of the microswitch 116, thereby forcing the actuator arm 115 and the plunger 116a of the microswitch toward the case of the microswitch into the activated position, when the actuator arm 115 is released by the actuator spring 112 attached to the control lever 96.

FIGURES 7, 8, 9, 10 show schematically the relation between the inner axis caging ring 45, the recess 59 therethrough, and the head 64 of the caging spindle 61 which is fitted to the recess 59, during various steps in the process of caging the gyro about the inner axis thereof.

FIGURE 8 shows schematically the relation between the cupped head 64 of the caging spindle, during the process of caging the inner axis caging ring 45, or rotating the inner axis caging ring 45 into a position in which the recess 59 through the inner caging ring 45 is in line with the cylindrical head 64 of the caging spindle.

When the caging spindle 61 is rotated by means of the caging motor 87 and the pinion 86 shown in FIGURE 1, in the direction shown by the arrow 61a, FIGURE 8, the open left-hand surface of the head 64 of the caging spindle engages one of the rim rails 60, 60a around the outer circumference of the inner caging ring, thereby rotating the inner caging ring 45 from the position shown in FIGURES 7 and 8, into the position shown in FIGURE 9, in which the head 64 of the caging spindle is in axial alignment with the recess 59 through the inner caging ring, the caging spindle being rotated in the direction shown by the arrows 61a, FIGURES 7 and 8, and the caging ring 45 rotated in the direction shown by the arrows 45a, FIGURES 7 and 8.

When the inner caging ring 45 reaches a position in which the recess 59 therethrough is in alignment with the head 64 of the caging spindle, the caging spindle is moved toward the caging ring by the control lever 96, which is angularly positioned by the rotary solenoid 98 shown in FIGURES 17 and 18, the cylindrical portion of the head of the caging spindle is moved into the recess 59 through the inner caging ring 45 until the flange 68 of the caging spindle engages the outer surface of the projecting head 71 of the pin 70 attached to the caging ring. The rotation of the caging spindle continues until one of the radial slots 69, 69a through the flange 68 of the caging spindle is in alignment with the head 71 of the pin 70 projecting beyond the outer surface of the inner caging ring. After the slot through the flange 68 of the caging spindle is aligned with the projecting head 71 of the pin 70, the caging spindle is again moved toward the caging ring from the position shown in FIGURE 9, to the fully caged position shown in FIGURE 10, the cylindrical portion of the head of the caging spindle being continuously moved into the recess through the inner caging ring.

In this fully caged position, FIGURE 10, the rotation of the caging spindle 61 is operative to rotate the caging ring 45 and the outer gimbal 40 of the gyro about the outer axis 41 of the gyro into the outer axis caging position, in a manner hereinafter described.

FIGURES 11 and 12 show schematically the various steps in the process of moving the caging spindle from the uncaged position shown in FIGURE 11 to the fully caged position shown in FIGURE 12.

When the caging spindle 61 is in the uncaged position, shown in FIGURE 11, after the inner caging ring has been rotated into the position shown in FIGURES 9 and 12, with the head of the caging spindle in axial alignment with the recess 59 through the inner caging ring 45, the control lever 96 is in the outer angular position shown in FIGURE 11.

The power torque of the rotary solenoid 98, shown in FIGURES 19 and 18, is operative to rotate the shaft of the solenoid, and the control lever 96 attached thereto, in the direction shown by the arrow 113, FIGURE 11, until the cylindrical head 64 of the caging spindle is completely free of the rim rails 60, 60a surrounding the inner caging ring, the flange 68 of the caging spindle reaching the outward limit of the movement of the caging spindle.

The uncaging rotary solenoid is controlled by the microswitch 116 shown in FIGURE 16, which is controlled by the actuator spring 112 attached to the long arm of the control lever 96. In this position of the caging spindle 61, the actuator spring 112 moves the actuator arm 115, attached to the microswitch 116 away from the case of the microswitch 116, thereby allowing the plunger 116a of the microswitch to move into the "uncaged" or open position, shown in FIGURE 21, thereby de-energizing the uncage rotary solenoid 98, and allowing the return spring thereof to move the control lever into the fully caged position shown in FIGURE 12.

In this position shown in FIGURE 11, the uncage locking solenoid 107 is de-energized, the plunger 106 thereof being forced outward under the notched end 105 of the control lever, thereby retaining the control lever in the uncaged position, until the rotary solenoid 98 is again energized.

The uncage locking solenoid 107 is held in the de-energized position, while the caging spindle is in the uncaged position shown in FIGURE 11, by an externally mounted cage-uncage switch 119 which is shown in the open position in the two-axis caging circuit shown in FIGURE 21.

When the cage-uncage switch 119 is closed, the uncage locking solenoid 107 is controlled by the microswitch 111, the actuating roller 110a of which is controlled by the cam surfaces 109a, 109b, at the cam end of the control lever 96, as shown in FIGURES 1 and 11.

In the uncage position shown in FIGURE 11, one of the cam surfaces 109a, 109b, at the short end of the control lever, forces the actuating roller 110a of the microswitch 111 toward the case of the microswitch, thereby moving the microswitch into the activated position, so that the uncage locking solenoid 107 may be energized, when the externally mounted cage-uncage switch 119 is activated.

In this position of the caging spindle, the outer axis braking solenoid 101 is also de-energized, the plunger 102 thereof being out of engagement with the circumferential grooves around the braking wheel 72.

The outer axis braking solenoid 101 is also retained in the de-energized position by the external cage-uncage switch 119, the same switch controlling both the outer axis braking solenoid 101 and the uncage locking solenoid 107 in the manner shown in the wiring circuit, shown in FIGURE 21.

The microswitch 111 which controls the uncage locking solenoid 107 also controls the outer axis braking solenoid 101, when the external cage-uncage switch 119 is activated, in the "cage" position.

In the uncaged position shown in FIGURE 11, the microswitch 111 is in the activated position as hereinbefore described.

In this position of the caging spindle 61, the caging motor 87 which is shown in FIGURE 11, is also de-energized, thereby arresting the rotation of the caging spindle.

With the caging spindle in the outer or uncaged position shown in FIGURE 11, the spur gear 82 forces the arm of the locking lever outward, thereby retaining the latching leg 77 of the locking lever out of engagement with the slot through the rim 75 of the braking wheel.

In this position, the plunger 93 of the microswitch 92 is out of engagement with the actuator screw 90 attached to the latching leg of the locking lever, thereby moving the plunger 93 of the microswitch 92 into the activated position insofar as the caging motor 87 is concerned, as shown in the wiring circuit, FIGURE 21.

The cam 108 at the short end of the control lever 96 engages the actuating roller 110a of the microswitch 111, thereby moving the plunger 111a of the microswitch 111 inward toward the case of the microswitch, into the activated position, insofar as the outer axis brake solenoid and the uncage locking solenoid, which are controlled by the microswitch 111 are concerned.

The actuator spring 112 at the long end of the control lever 96, moves the actuator arm 115 of the microswitch 116, shown in FIGURE 16, outward, away from the case of the microswitch, thereby allowing the plunger 116a of the microswitch 116 to move outward into the "uncage" position shown in FIGURE 21.

When the caging spindle 61 is in the fully caged position, shown in FIGURE 12, with the cylindrical portion of the head 64 of the caging spindle 61 moved into the recess 59 through the inner caging ring 45, the control lever 96 is in the inner angular position shown in FIGURE 12, with the arcuate lower end of the control lever moved toward the inner caging ring 45.

The actuator spring 112 attached to the long arm of the control lever 96 is moved free of the actuator arm 115, pivotally attached to the microswitch 116, shown in FIGURE 16, thereby allowing the formed spring 117 attached to the case of the microswitch 116, to move the actuator arm 115 of the microswitch 116 and the plunger 116a thereof toward the case of the microswitch 116, thereby activating the microswitch 116, and energizing the uncage rotary solenoid, the power torque of which is prepared to move the caging spindle 61 into the uncaged position shown in FIGURE 11, when the externally mounted cage-uncage switch 119, shown in FIGURE 21, is moved to the "cage" position 119c, right-hand, FIGURE 21.

The caging spindle 61 is moved into the caging position, shown in FIGURE 12, by the action of the return spring of the uncage rotary solenoid 98, which rotates the shaft 97 thereof and the control lever 96 attached thereto, in the direction shown by the arrow 120 shown in FIGURE 12.

In this position of the caging spindle, the uncage locking solenoid 107 remains de-energized, the plunger 106 of the solenoid being pressed against the arcuate outer end 104 of the control lever 96, as shown in FIGURE 12.

When the externally mounted cage-uncage switch 119 which is shown in FIGURE 21 is in the cage position 119c, right-hand, FIGURE 21, the uncage locking solenoid 107 is controlled by the microswitch 111, the actuating roller 110a of which is controlled by the cam surfaces 109a, 109b of the cam attached to the control lever.

In the control lever position shown in FIGURE 12, the cam 108 is free of the actuating roller 110a of the microswitch, thereby allowing the actuating arm 110 and the plunger of the microswitch 111 to move outward away from the case, and in that manner moving the plunger 111a into the open position.

The same microswitch 111 also controls the outer axis braking solenoid 101 in this position of the caging spindle, so that as the microswitch 111 is open, the outer axis braking solenoid 101 is also de-energized, the plunger 102 thereof thereby being drawn out of engagement with the circumferential grooves around the rim of the braking wheel 72, thus leaving the outer gimbal 40 to rotate.

The caging motor 87 in this position of the caging spindle, is controlled by the microswitch 92 which is operated by the latching leg 77 of the locking lever 78, the cage-uncage switch 119 being in the "cage" position, right-hand 119c, FIGURE 21.

In the locking lever position shown in FIGURE 12, the actuator screw 90 attached to the latching leg 77 of the locking lever forces the plunger of the microswitch 92 toward the case of the microswitch 92, thereby moving the microswitch into the "cage" position, FIGURE 21, and in that manner de-energizing the caging motor, and holding the outer gimbal stationary.

The cam 108 at the short end of the control lever is out of engagement with the actuating roller of the microswitch 111, thereby moving the microswitch into the open position.

The actuator spring 112 at the long end of the control lever 96 is free of the actuator arm 115 of the microswitch 116 shown in FIGURE 16, thereby allowing the formed spring 117 attached to the case of the microswitch, to move the actuator arm 115 and the plunger 116a of the microswitch toward the case thereof, and in that manner activate the microswitch 116.

When the caging spindle 61 is moved into the fully caged position, shown in FIGURE 12, the spur gear 82 attached to the caging spindle is moved toward the inner caging ring, thereby releasing the adjusting screw 85 attached to the short arm of the locking lever, the tension spring 88 attached to the latching leg 77 of the locking lever being operative to draw the latching outer end 77a of the latching leg 77 into the rectangular slot 76 through the rim of the braking wheel, thereby latching the outer gimbal of the gyro about the outer axis 41 thereof, when the braking wheel is rotated into the position in which the slot 76 through the rim thereof is in alignment with the latching leg 77 of the locking lever, in the position shown in FIGURE 12.

In this position, the actuator screw 90 attached to the latching legs 77 of the locker lever engages the plunger 93 of the microswitch 92, thereby opening the microswitch 92 and shutting off the caging motor 87, after the latching operation is completed, and in that manner completely caging and locking the outer gimbal 40 of the gyro.

FIGURE 13 is a longitudinal section through a modification of the free gyro construction shown in FIGURE 1, in which the locking lever 78 shown in FIGURES 1, 5 and 6 is eliminated, the outer axis braking solenoid 101 shown in FIGURES 1 and 13 being utilized to engage the grooves around the braking wheel to arrest the rotation of the braking wheel at any predetermined, or preset angular position of the braking wheel, at which the outer axis braking solenoid 101 is energized, the plunger 102 of the outer axis braking solenoid engaging one of the grooves around the outer circumference of the braking wheel to arrest the rotation of the braking wheel, and therefore the rotation of the outer gimbal of the gyro about the outer axis 41 thereof.

The modified construction, shown in FIGURE 13, is substantially the same as that shown in FIGURE 1, the inner and outer axes 39 and 41 being substantially the same as those shown in FIGURE 1.

The inner axis caging ring 45 and the caging spindle 61, shown in FIGURE 13, are substantially the same as those shown in FIGURE 1, the caging spindle 61 functioning in substantially the same manner.

The rim rails 60, 60a of the caging ring and the recess 59 through the outer wall thereof are substantially the same as those shown in FIGURES 1 and 3.

The head of the caging spindle is substantially the same as that shown in FIGURE 1, the cylindrical portion of the head fitting into the recess through the caging ring in the same manner.

The flange 68 of the head of the caging spindle, and the radially positioned slots 69, 69a through the flange thereof are substantially the same as those shown in FIGURE 1, one of the slots 69 through the flange of the caging spindle engaging the head of the pin 70 projecting beyond the outer circumference of the inner axis caging ring to rotate the inner axis caging ring about the outer axis of the gyro in the same manner as that shown in FIGURE 1.

The braking wheel 121, shown in FIGURE 13, is substantially the same as that shown in FIGURE 1, the braking wheel being attached to the hub 66 of the outer gimbal in the same manner. The circular body of the braking wheel has a plurality of radially positioned teeth 122 around the outer circumference thereof, a plurality of equally-spaced grooves being located between the teeth 122.

The circular rim 123, located adjacent one face of the braking wheel, is substantially the same as that shown in FIGURE 1, the rim being continuous, no slot being cut therethrough to receive the leg of the locking lever, shown in FIGURE 1, which has been eliminated.

The tubular sleeve 81 surrounding the shaft 62 of the caging spindle 61 and the spur gear 82 integral therewith, are substantially the same as those shown in FIGURE 1.

The caging motor pinion 86 which meshes with the spur gear 82 and the preset and caging motor 139 driving the pinion are substantially the same as those shown in FIGURE 1.

The controller lever 124 which is attached to the shaft 97 of the uncage rotary solenoid 98 is substantially the same as that shown in FIGURE 1, except that the short end of the control lever has two cams 125, 126 attached thereto, in the manner shown in FIGURES 17 and 18.

The yoke 127 which is attached to or integral with the control lever is substantially the same as that shown in FIGURE 1, the yoke being slidably fitted to the tubular sleeve 81 surrounding the shaft of the caging spindle, and functioning in the same manner as that shown in FIGURE 1.

Each of the cams 125, 126 attached to the short end of the control lever has a pair of oppositely positioned sloping surfaces 128a, 128b thereon, which are operative to engage the actuator rollers 129c, 130c of a pair of microswitches 129 and 130, which are located adjacent the cams 125, 126 in the position shown in FIGURES 13 and 17.

The outer axis braking solenoid 101 and the plunger 102 fitted thereto are substantially the same as those shown in FIGURE 1, the braking solenoid being energized at a preset position relative to the rotational angular position of the braking wheel 121 in order to enable the solenoid plunger 102 to arrest the rotation of the braking wheel 121 at any preset angular position of the outer gimbal 40 of the gyro in a manner hereinafter described in greater detail.

The lower end of the control lever is of circular segmental contour 135, as shown in FIGURES 13 and 18, a notch 131 being cut into the lower end of the control lever, in substantially the same position as that shown in FIGURE 1, to enable the control lever to clear the plunger 106 of the uncage locking solenoid 107 when the uncage locking solenoid is de-energized, the plunger thereof assuming the position shown in FIGURE 14.

The rotary solenoid 98 is rotated by its power torque in a direction shown by the arrow 113, shown in FIGURE 13, in order to move the caging spindle 61 into the uncaged position shown in FIGURE 14, the return spring of the rotary solenoid being operative to rotate the solenoid shaft 97 in the opposite direction, arrow 120, in order to move the head of the caging spindle into the fully caged position, shown in FIGURE 15, in engagement with the recess 59 through the inner caging ring.

The long arm of the control lever 124 has an actuator spring 112 attached thereto in the manner shown in FIGURES 1, 3 and 18, a channel 134 being formed in the outer portion of the control lever to clear the free end of the actuator spring 112.

The microswitch 116, used in conjunction with the actuator spring 112 attached to the control lever, is substantially the same as the one shown in FIGURE 16, and hereinbefore described, the hook end 115a of the actuator arm 115 being forced against the actuator spring 112, to enable the actuator spring 112 to move the actuator arm 115 of the microswitch 116 away from the case of the microswitch, thereby allowing the microswitch plunger to move outward into the open position shown in FIGURE 16, when the caging spindle is in the uncaged position, shown in FIGURE 14.

FIGURES 13, 14 and 15 show schematically the various steps in the process of moving the caging spindle of the preset gyro mechanism shown in FIGURE 13, from the uncaged position shown in FIGURE 14, through the inner axis caging position shown in FIGURE 13, to the inner axis fully caged position shown in FIGURE 15.

When the caging spindle is in the uncaged position, shown in FIGURE 14, after the caging ring has been rotated into the position shown in FIGURES 9 and 15, with the cylindrical head of the caging spindle in axial alignment with the recess 59 through the inner axis caging ring 45, the control lever 124 is in the outer angular position shown in FIGURE 14.

The power torque of the uncaging rotary solenoid, shown in FIGURE 13, is operative to rotate the control lever 124 in the direction of the arrow 113 shown in FIGURE 13, until the cylindrical head 64 of the caging spindle is completely free of the inner axis caging ring, in the position shown in FIGURE 14.

In the caging spindle position shown in FIGURE 14, one of the cams 125, 126 attached to the short end of the control lever 124 engages the actuator roller 129c attached to one of the microswitches 129, 130, thereby moving the actuator arm 129b and the plunger of the microswitch toward the case thereof, into the open or "uncage" position shown in FIGURE 22, and in that manner de-energizing the rotary solenoid and retaining the caging spindle in the outer or uncaged position shown in FIGURE 14.

In this position of the caging spindle, the uncage locking solenoid 107 is de-energized, the plunger 106 thereof being forced outward under the notched end 131 of the control lever.

In this position of the caging spindle 61, the uncage locking solenoid 107 and the outer axis braking solenoid 101, are controlled by the externally mounted cage-uncage switch 140 shown in the wiring circuit, FIGURE 22, which is in the open or uncaged position shown in FIGURE 22, thereby de-energizing the uncage locking solenoid, and the outer axis braking solenoid 101.

The uncage locking solenoid 107 and the outer axis braking solenoid 101, are also controlled by one of the microswitches 130, which is controlled by the cam 126 attached to the short end of the control lever 124. The cams 125, 126 engage the actuator rollers 129c, 130c of the microswitches 129, 130, thereby moving the actuator arms and the plungers 129a, 130a of the microswitches toward the cases thereof, and in that manner moving one of the microswitches 130 into the activated position, so that the outer axis braking solenoid 101 and the uncage locking solenoid 107 can again be energized when the externally mounted cage-uncage switch 140 is moved into the "caging" position, right-hand, FIGURE 22.

In this position of the caging spindle, the outer axis braking solenoid 101 is also de-energized, the plunger 102 thereof being out of engagement with the circumferential grooves around the braking wheel.

The caging motor 139 shown in FIGURE 13 is also de-energized, the caging spindle being held stationary.

The second microswitch 129 is controlled by one of the cams 125, 126 attached to the short end of the control lever 124. One of the cams 125 moves the actuator arm 129b and the plunger 129a of the microswitch 129 into the open or uncaged position, shown in FIGURE 22, thus de-energizing the uncaging rotary solenoid 98.

Before the inner caging ring 45 reaches the position shown in FIGURES 9 and 15, with the recess 59 through the inner caging ring aligned with the axis of the head of the caging spindle, it is necessary to rotate the inner caging ring into this position. The head of the caging spindle is moved into a position in which the contact surface of the head 64 of the caging spindle is in engagement with one of the rim rails surrounding the inner caging ring 45.

Because the rim rails 60 and 60a are located on opposite sides of the center of the head 64 of the caging spindle, as shown in FIGURE 3, and radially positioned along circular segments on opposite sides of the axis of the caging spindle, the inner caging ring will be rotated in a direction toward the recess 59 therethrough, even though the caging spindle is continuously rotated in the one direction, the caging spindle always being rotated in the same direction shown by the arrow 137 shown in FIGURE 14, by the caging motor and the pinion 86 driven thereby, as shown in FIGURE 13.

In order to rotate the recess 59 through the inner caging ring into alignment with the cylindrical head 64 of the caging spindle, the control lever 124 and the caging spindle attached thereto are moved to the position shown in FIGURE 13, with the open end of the head of the caging spindle in engagement with one of the rim rails 60, 60a surrounding the inner caging ring 45. The control lever 124 is moved into this position by the action of the return spring of the rotary solenoid, which rotates the shaft of the rotary solenoid and the control lever 124 attached thereto in the direction of the arrow 120 shown in FIGURE 13, the uncage rotary solenoid 98 being de-energized.

While the caging spindle is in the caging position shown in FIGURE 13, the external cage-uncage switch 140 is open, so that the rotary solenoid is de-energized.

In this position, the uncage locking solenoid 107 is energized by the microswitch 130 which is retained in the activated position by the cam 126 at the short end of the control lever.

In this position of the caging spindle, the flow of current to the uncage locking solenoid 107 and the outer axis braking solenoid 101 is actually controlled by the external cage-uncage switch 140 shown in FIGURE 22, which is in the "cage" position 140c, right-hand, FIGURE 22, thereby allowing the current to flow through the microswitch 130, and energizing the outer axis braking solenoid, and the uncage locking solenoid 107.

The plunger 106 of the uncage locking solenoid is therefore in the free position, out of engagement with the arcuate lower end of the control lever.

The outer axis braking solenoid 101 is also energized by the external cage-uncage microswitch 140, the plunger 102 of the solenoid being forced into engagement with one of the circumferential grooves around the outer circumference of the braking wheel 121, thus preventing rotation of the outer gimbal 40 of the gyro, about the outer axis 41 thereof, during the caging adjustment of the inner axis caging ring 45.

The caging and preset motor 139 is also energized by the D.C. line 145 shown in the wiring diagram, FIGURE 22, the caging motor being controlled by the microswitch 116 shown in FIGURE 16.

In this position of the caging spindle, the actuator spring 112 attached to the control lever 124 is moved out of engagement with the actuator arm of the microswitch 116 shown in FIGURE 16, thereby allowing the formed spring 117 attached to the case of the microswitch 116 to move the plunger 116a thereof into the activated position, and in that manner energizing the caging motor 139 and allowing it to rotate the caging spindle, and therefore the inner axis caging ring in the manner hereinbefore described.

The caging motor rotation is continued until the recess through the inner caging ring is aligned with the axis of the caging spindle, the cylindrical body of the head of the caging spindle being forced into the recess 59 through the inner caging ring by the continued action of the return spring of the rotary solenoid 98, which continues to force the head of the caging spindle against the rim rails of the caging ring, until the cylindrical head of the caging spindle is moved into the inner axis fully caged position shown in FIGURE 15.

The cam surfaces 128a, 128b at the short end of the control lever engage the actuator rollers of the microswitches 129, 130 thereby moving the plungers 129a, 130a of the microswitches toward the cases of the microswitches and activating the microswitches 129 and 130.

The actuator spring 112 attached to the long end of the control lever, is moved out of engagement with the actuator arm 115 of the microswitch 116, shown in FIGURE 16, thereby allowing the spring 117 to force the actuator arm 115 against the plunger 116a of the microswitch toward the case of the microswitch, and in that manner activating the microswitch and continuing the rotation of the caging motor 139.

In the inner axis fully caged position, shown in FIGURE 15, the cylindrical portion 64a of the head of the caging spindle is inserted into the recess 59 through the inner caging ring 45, the control lever having been moved into the inner angular position shown in FIGURE 15.

The caging spindle is moved into the fully caged position shown in FIGURE 15, from the caging position shown in FIGURE 13 by the return spring of the rotary solenoid 98.

The actuator roller of the microswitch 129 which is controlled by one of the cams 125, 126 at the short end of the control lever 124 is free of the cams 125, 126, thus enabling the plunger 129a of the microswitch to move out of the case thereof into the activated or "cage" position, shown by the wiring circuit, FIGURE 22.

The uncage locking solenoid 107 is de-energized, the plunger 106 thereof being forced against the arcuate outer edge 135 of the control lever 124.

This solenoid is de-energized by one of the microswitches 130, which is controlled by the cam 126, the cam surfaces 128a, 128b being free of the actuator roller 130c of the microswitch, thereby allowing the plunger 130a of the microswitch to move outward away from the case of the microswitch to the open or preset position shown in FIGURE 15.

The uncage locking solenoid 107 and the outer axis braking solenoid 101 are also controlled by the external cage-uncage switch 140, which in this position of the caging spindle has been moved into the "cage" position 140c, right-hand, FIGURE 22, thereby allowing the current to flow through the uncage locking solenoid and the outer axis braking solenoid, when the cam-controlled switch 130 is moved into the activated position shown in FIGURE 22.

The caging and preset motor 139 is energized, the caging spindle being rotated by the spindle gear 82 until the preset angular position of the outer gimbal 40 is reached.

This motor is controlled by the microswitch 116 shown in FIGURE 16, the actuator arm 115 of which is released by the actuator spring 112, thereby allowing the formed spring 117 shown in FIGURE 16 to move the actuator arm 115 and the plunger 116a of the microswitch toward the case of the microswitch, thus activating the microswitch 116.

The outer axis braking solenoid 101 is also de-energized, the plunger 102 thereof being moved toward the solenoid, out of engagement with the grooves, around the outer circumference of the braking wheel 121.

The outer axis braking solenoid remains de-energized until the preset angular position of the braking wheel and the outer gimbal 40 is reached.

The outer axis braking solenoid is controlled by the microswitch 130 which is in the preset or open position, when the control lever is in the position shown in FIGURE 15.

The cams 125, 126 at the short end of the control lever are out of engagement with the actuator rollers 129c, 130c of both microswitches 129, 130, thereby allowing the plungers of both microswitches 129, 130, to be moved to the preset or open position.

The actuator spring 112 attached to the long end of the control lever is moved free of the actuator arm of the microswitch shown in FIGURE 16, thereby allowing the formed spring 117 to move the actuator arm and the plunger 116a of the microswitch into the activated position.

FIGURES 21 and 22 show the wiring circuits of the two-axis caging mechanism shown in FIGURE 1, and the preset caging mechanism shown in FIGURE 13, respectively.

Both circuits are shown in the uncaged position.

In the wiring circuit shown in FIGURE 21, the current flows from a D.C. source 142, through the externally mounted cage-uncage switch 119, through the uncaging rotary solenoid 98 shown in FIGURE 1, to the actuator spring-controlled microswitch 116 shown in FIGURE 16 which under these conditions is open, and out through the D.C. outlet 143.

When the remotely mounted cage-uncage switch 119 is moved to the "cage" position 119c, the current flows through the outer axis braking solenoid 101, and the uncage locking solenoid 107, which are connected in parallel, thence through the cam-controlled microswitch 130 to the discharge line 144 to the outlet 143.

While the external cage-uncage switch 119 is in this position, the current flows through the external cage-uncage switch 119 to the caging motor 87, through the locking lever-controlled microswitch 92, thence through the discharge line 144 to the outlet 143.

In the circuit shown in FIGURE 22, which is also shown in the uncaged position, and covers the preset caging mechanism shown in FIGURE 13, the current flows from the D.C. source 145, through the external cage-uncage switch 140 when it is in the "uncage" position, through the uncaging rotary solenoid 98, thence through one of the cam-controlled microswitches 129, when it is in the "cage" position 129c, thence to the outlet 147.

While the external cage-uncage switch 140 is in the "cage" position, the current flows through the external switch 140, thence through the outer axis braking solenoid 101, the uncage locking solenoid 107, and the transfer relay 148, which are connected in parallel, thence through the cam controlled microswitch 130, through the line 149, to the outlet 147.

The current for the caging motor 139 is fed from a preset D.C. power source 146, through an auxiliary switch 150, which is mechanically coupled to and controlled by the transfer relay 148, through the caging motor 139, thence through the actuator spring-controlled microswitch 116, when it is in its activated position, thence through a second auxiliary switch 151, which is mechanically coupled to the transfer relay 148, and out through an auxiliary outlet 146a.

When the circuit is changed to the caged position, the current flows from the D.C. source 145, through the external cage-uncage switch 140, which is in the "cage" position, 140c, through the auxiliary switch 151, which is moved to the left-hand position, FIGURE 22, thence through the actuator spring-controlled microswitch 116, through the caging motor 139, through the first auxiliary switch 150, which is moved to the left-hand position, FIGURE 22, to the line 149 and out through the main outlet 147.

When the two-axis circuit shown in FIGURE 21 is in the uncaged position, the external cage-uncage switch 119 is open in the "uncage" position, right-hand, so that no current flows through the circuit.

When the external cage-uncage switch is moved to the "cage" position 119c, and the entire circuit transferred to the caged position, the external cage-uncage switch is activated, thereby allowing the current to flow through the uncage rotary solenoid 98, when the actuator spring-controlled microswitch 116 is in the activated or "cage" position, 116c.

The current also flows through the outer axis braking solenoid 101 and the uncage locking solenoid 107, while the cam-controlled microswitch 130 is in the activated position, shown in FIGURE 21, and through the caging motor 87 while the locking lever-controlled microswitch 92 is in the activated position shown in FIGURE 21.

While the present circuit shown in FIGURE 22, is in the uncaged position, shown in FIGURE 22, the external cage-uncage switch 140 is open, so that no current flows to any of the components through the main power source 145, except the uncaging rotary solenoid 98 when the cam-controlled microswitch 129 is activated.

As the actuator spring controlled microswitch 116 is also open, no current flows from the auxiliary preset power source 146 through the caging motor 139.

When the externally mounted cage-uncage switch 140 is moved to the "cage" position 140c, the circuit is opened through the uncage rotary solenoid 98. The current does however flow through the outer axis braking solenoid 101, the uncage locking solenoid 107 and the transfer relay 148, while the cam-controlled microswitch 130 is in the solid line position shown in FIGURE 22.

When the transfer relay 148 moves the auxiliary switches 150, 151 to the left-hand position, FIGURE 22, the current flows from the external cage-uncage switch 140, through the second auxiliary switch 151, thence through the caging motor 139, when the actuator spring-controlled microswitch 116 is activated, through the first auxiliary switch 150, thence through the line 149 to the outlet 147.

FIGURES 23, 24 and 25 show another modification of the gyro caging mechanism shown in FIGURES 1 and 13.

FIGURE 24 shows the modified construction in the caging position, with the head of the caging spindle in engagement with one of the rim rails surrounding the inner caging ring.

This construction is essentially the same as that shown in FIGURE 1, except for the addition of an auxiliary cupped ring 152, which is attached to the inner surface of the braking wheel 153 by a plurality of screws 154 or other suitable attaching means. The annular rim 155 integral with the outer circumference of the auxiliary cupped ring 152 has a plurality of equally-spaced radially positioned slots 156, 156a, therethrough, the slots being operative to receive the latching leg 157, of a pivotal locking lever 158, which is essentially the same as that shown in FIGURES 1, 5 and 6, and is supported in the same manner.

A wider slot 156b is cut through the annular rim 155 surrounding the auxiliary cupped ring 152 in substantial alignment with the slot 161 through the rim 160 of the braking wheel, to clear the latching leg 157 of the locking lever in the locking position shown in FIGURE 25.

The inner and outer axes 39 and 41 of the gyro are essentially the same as those shown in FIGURE 1.

The inner axis caging ring 45 is substantially the same as that shown in FIGURE 1, the inner caging ring supporting the gyro rotor 42 in the same manner.

The inner axis caging ring is trunnioned in the outer gimbal 40 of the gyro in the same manner as that shown in FIGURE 1.

The construction of the inner axis caging ring is essentially the same as that shown in FIGURES 1 and 2, the inner caging ring having an elongated opening or recess 59 therethrough to receive the cylindrical section 64a of the body of the caging spindle 61 in the inner axis caged position shown in FIGURE 25.

The rim rails 60, 60a surrounding the inner axis caging ring 45 are essentially the same as those shown in FIGURES 1 and 3, the rim rails serving substantially the same purpose.

The caging spindle 61 which is used in conjunction with the modified construction shown in FIGURES 23, 24 and 25, is essentially the same as that shown in FIGURE 1, the caging spindle functioning in the same manner.

The spindle shaft 62 of the caging spindle is essentially the same as that shown in FIGURE 1, and is slidably and rotatably supported and operated in essentially the same manner.

The head 64 of the caging spindle consists of a substantially cylindrical body 64a, with a circular flange 68 integral with the outer end of the cylindrical body, the flange having a plurality of equally-spaced radially positioned slots 69, 69a therethrough in the same manner as that shown in FIGURES 1 and 3.

The cylindrical body 64a of the head of the caging spindle is operative to fit into the recess 59 through the inner axis caging ring in the position shown in FIGURE 25 to latch the inner axis caging ring in the same manner as that shown in FIGURE 1.

The pin 70 attached to the inner axis caging ring 45 and the projecting head 71 thereof are essentially the same as those shown in FIGURES 3 and 4, the projecting head of the pin fitting through one of the slots 69, 69a through the flange 68 of the caging spindle and functioning in the same manner as that shown in FIGURES 1 and 3.

The braking wheel 153 shown in FIGURES 23, 24 and 25, is essentially the same as that shown in FIGURE 1, except that the radial teeth around the outer circumference thereof are eliminated, the outer circumference of the braking wheel body being smooth and circular. The circular rim 160 integral with the body of the braking wheel is essentially the same as that shown in FIGURE 1, the circular rim having a radial slot 161 therethrough to receive the latching extension of the latching leg 157 of the pivoted locking lever 158 in the locking position shown in FIGURE 25, in the same manner as that shown in FIGURES 1 and 12 as hereinbefore described.

The locking lever is pivotally supported by a pivot pin 80 in substantially the same manner as that shown in FIGURE 1.

The tubular sleeve 81 fitted to the shaft 62 of the caging spindle 61 and the spur gear 82 integral therewith are essentially the same as those shown in FIGURE 1, and are supported and function in substantially the same manner.

The arm 162 integral with the locking lever, and the adjusting screw 85 threadably attached thereto, are essentially the same as those shown in FIGURE 1 and function in the same manner.

A switch actuator screw 90, similar to that shown in FIGURE 1, is threadably attached to the latching leg 157 of the locking lever 158, the screw having a lock nut threadably attached thereto.

A microswitch 163 having a reciprocating plunger 163a fitted thereto is supported by the outer case of the unit in substantially the same manner as that shown in FIGURE 1, the plunger 163a of the microswitch being located in such a position that it is engaged by the outer end of the actuator screw 90 attached to the latching leg 157 of the locking lever, the actuator screw 90 being operative to move the plunger 163a of the microswitch 163 toward the case thereof into the activated position shown in FIGURE 25, when the latching leg 157 of the locking lever is in the latching position shown schematically in FIGURE 25 and hereinafter described in greater detail.

The caging pinion 86 which meshes with the spur gear 82 surrounding the shaft of the caging spindle 61, and the caging motor 87 which drives the caging pinion are essentially the same as those shown in FIGURE 1 and hereinbefore described, the caging spindle being rotated in the same manner.

The coiled tension spring 88, one looped end 88a of which is attached to the latching leg 157 of the locking lever 158 is essentially the same as that shown in FIGURE 1 and hereinbefore described.

The control lever 96 which is attached to the rotatable central shaft 97 of the rotary solenoid 98 is essentially the same as that shown in FIGURE 1, and functions in substantially the same manner to control the longitudinal movement of the caging spindle.

The yoke 99, which is attached to, or integral with the control lever is slidably fitted to the tubular sleeve 81, which surrounds the shaft 62 of the caging spindle, functions in substantially the same manner as that shown in FIGURE 1.

The lower end of the control lever 96 is substantially the same as that shown in FIGURES 1, 11 and 12, the notch 105 cut into the lower end of the control lever also being the same and being utilized for essentially the same purpose.

The uncage locking solenoid 107, the reciprocating plunger 106 of which is operative to press against the arcuate lower end 104 of the control lever 96, or fit into the notch 105 at the lower corner of the control lever are essentially the same as those shown in FIGURES 1, 11 and 12, and hereinbefore described.

The short end of the control lever 96 has a cam 108 attached thereto, in the same manner as that shown in FIGURES 19 and 20, the cam having a pair of sloping cam surfaces 109a, 109b thereon, which are operative to engage the actuating roller 164c of a microswitch 164, in substantially the same manner as those shown in FIGURES 11 and 19.

The long arm of the control lever 96 has a spring actuator 112 attached thereto in the same manner as that shown in FIGURES 1, 11 and 12, a channel 114 being cut out of the outer end of the control lever adjacent the free end of the actuator spring 112 in the same manner.

The rotary solenoid 98 functions in substantially the same manner as that shown in FIGURES 1, 11 and 12, the rotary solenoid being rotated in the direction shown by the arrow 113, in order to move the caging spindle into the uncaged position shown in FIGURE 23, the return spring of the rotary solenoid being operative to rotate the shaft thereof in the opposite direction, arrow 120, to move the cylindrical head 64 of the caging spindle into the fully caged positions shown in FIGURE 25, with the cylindrical portion of the head fitted to the recess 59 through the inner axis caging ring 45.

The microswitch 116 mounted adjacent the actuator spring 112, attached to the long end of the control lever, is substantially the same as that shown in FIGURE 16, the microswitch being operated in substantially the same manner. In the position shown in FIGURE 23, the hooked end 115a of the actuator arm 115 of the microswitch 116 is moved outward away from the case of the microswitch 116, thereby moving the plunger of the microswitch 116, shown in FIGURE 16, into the open position.

FIGURES 23, 24 and 25 show schematically, the various steps in the process of moving the caging spindle of the modified caging construction shown in FIGURE 23, from the uncaged position shown in FIGURE 23, through the inner axis caging position shown in FIGURE 24, into the fully caged position shown in FIGURE 25.

When the caging spindle 61 is in the uncaged position, shown in FIGURE 23, after the inner axis caging ring has been rotated into the position shown in FIGURES 9 and 12, with the head 64 of the caging spindle in axial alignment with the recess 59 through the inner axis caging ring, the control lever 96 is in the outer angular position, shown in FIGURE 23, with the head of the caging spindle free of the rim rails 60, 60a surrounding the inner axis caging ring 45.

The power torque of the rotary solenoid 98 is operative to rotate the shaft 97 of the rotary solenoid, and the control lever 96 attached thereto, in the direction shown by the arrow 113, FIGURE 23, until the cylindrical head 64 of the caging spindle 61 is completely free of the rim rails 60, 60a surrounding the inner axis caging ring 45, the control lever 96 reaching its outer angular position shown in FIGURE 23, which limits the outward movement of the caging spindle 61.

The uncaging rotary solenoid 98 is controlled by the microswitch 116 shown in FIGURE 16, which is in turn controlled by the actuator spring 112 attached to the long arm of the control lever 96. In this position of the control lever 96, the actuator spring 112 attached to the control lever moves the actuator arm 115 of the microswitch 116 away from the case of the microswitch 116, thereby allowing the plunger 116a of the microswitch to move into the uncaged or open position, shown in FIGURE 16, and in that process de-energizing the rotary solenoid 98, and allowing the return spring thereof to move the control lever 96 into the fully caged position shown in FIGURE 25.

In the position, shown in FIGURE 23, the uncage locking solenoid 107 is de-energized, the plunger 106 thereof being forced outward under the notched end 105 of the pivoted control lever, thereby retaining the pivoted control lever in the uncaged position, until the uncage locking solenoid 107 is again energized.

The uncage locking solenoid 107 is held in the de-energized position, shown in FIGURE 23, by an externally mounted cage-uncage switch 119, which is similar to that shown in the open or "uncage" position in the two-axis caging circuit shown in FIGURE 21.

When the external cage-uncage switch is moved into the activated or "cage" position, right-hand, FIGURE 21, the uncage locking solenoid 107 controlled by the cam actuated microswitch 164, located adjacent the cam end of the control lever 96.

In the uncaged position, shown in FIGURE 23, one of the cam surfaces 109a, 109b at the cam end of the control lever 96, forces the actuating roller 164c of the microswitch 164 toward the case of the microswitch, thereby moving the microswitch 164 into the activated position, so the uncage locking solenoid 107 may be energized, when the externally mounted cage-uncage switch 119 is activated.

In this position of the caging spindle, the caging motor 87 is also de-energized, thereby arresting the rotation of the caging spindle.

With the caging spindle in the outer or uncaged position shown in FIGURE 23, the spur gear 82 forces the arm 162 of the locking lever outward, thereby moving the latching leg 157 of the locking lever completely free of the rim 160 of the braking wheel 153 and the rim of the auxiliary cupped ring 152, as shown in FIGURE 23, so that the locking lever is completely free of the braking wheel 153, and the auxiliary cupped ring 152.

In this position of the caging spindle, the spring actuator 112 attached to the long arm of the control lever 96 forces the actuator arm 115 of the microswitch shown in FIGURE 16, outward, away from the case of the microswitch, thereby allowing the microswitch plunger 116a to move outward into the open position shown in FIGURE 16, when the caging spindle is in the uncaged position shown in FIGURE 23.

Before the inner axis caging ring 45 reaches the position shown in FIGURES 9 and 25, with the recess 59 through the inner axis caging ring 45 aligned with the cylindrical portion of the head 64 of the caging spindle 61, it is necessary to rotate the inner axis caging ring 45 into this position. The head of the caging spindle is moved into a position in which the contact surface of the head thereof is in contact with one of the rim rails 60, 60a surrounding the inner axis caging ring 45.

The inner axis caging ring is always rotated in a direction toward the recess 59 therethrough, when the caging spindle 61 is rotated in the direction shown by the arrow 137, for the reasons hereinbefore described in conjunction with the caging construction shown in FIGURES 1, 11 and 12.

In order to rotate the recess 59 through the caging ring into alignment with the cylindrical head 64 of the caging spindle 61, the control lever 96 and the caging spindle 61 attached thereto are moved into the position shown in FIGURE 24, with the open end of the head 64 of the caging spindle in contact with one of the rim rails 60, 60a surrounding the inner axis caging ring 45. The control lever 96 is moved into this position by the action of the return spring of the uncaging rotary solenoid 98, which rotates the control lever 96 attached to the shaft thereof in the direction of the arrow 120 shown in FIGURE 24, the uncage rotary solenoid 98 being de-energized.

While the caging spindle is in the caging position, shown in FIGURE 24, the external cage-uncage switch 119 is in the "cage" position, or open in the direction of the uncaging rotary solenoid 98, so that the rotary solenoid is de-energized.

In this position of the caging spindle, the flow of current to the uncage locking solenoid 107 is actually controlled by the external cage-uncage switch 119, similar to that shown in FIGURE 21, which is in the "cage" position 119c, right-hand, FIGURE 21, thereby allowing the current to flow through the cam-controlled microswitch 164, and the uncage locking solenoid 107.

The plunger 106 of the uncage locking solenoid 107 is therefore in the energized, or free position, out of engagement with the arcuate lower end of the control lever 96, as shown in FIGURE 24.

The caging motor 87 is also energized by the D.C. line 142 shown in the wiring diagram, FIGURE 21, the caging motor being controlled by the microswitch 163, which is controlled by the actuator screw 90, which is attached to the latching leg 157 of the locking lever 158, shown in FIGURE 24. In the inner axis caging position, shown in FIGURE 24, the actuator screw 90 attached to the latching leg 157 of the locking lever is out of engagement with the plunger 163a of the microswitch 163, thus allowing the plunger to move outward into the activated position, thereby activating the microswitch and energizing the caging motor 87 so that the pinion 86 driven by the caging motor rotates the caging spindle, and therefore the inner axis caging ring until the recess 59 through the inner axis caging ring is aligned with the axis of the caging spindle 61, in the manner hereinbefore described.

The caging motor rotation is continued until the recess 59 through the inner axis caging ring 45 is aligned with the axis of the caging spindle, the cylindrical body of the caging spindle being forced into the recess 59 through the inner axis caging ring by the continued action of the return spring of the rotary solenoid 98, which continues to force the head of the caging spindle 61 against the rim rails of the inner axis caging ring 45, until the cylindrical head of the caging spindle 61 is moved into the inner axis fully caged position shown in FIGURE 25.

Before the latching leg 157 of the locking lever 158 reaches one of the braking positions shown in FIGURE 24, in which the latching leg 157 of the locking lever is fitted to one of the slots 156 through the rim 155 of the auxiliary cupped ring, the latching leg of the locking lever is moved through an intermediate position 157b, shown in FIGURE 26, while the caging spindle 61 is moved from the uncaged position shown in FIGURE 23, to the inner axis caging position shown in FIGURE 24.

In this intermediate position 157b shown in FIGURE 26, and in dot-dash lines, FIGURE 24, the outer surface of the latching leg 157 of the locking lever engages the inner surface of the rim 155 of the auxiliary cupped ring 152, thereby retarding the rotation of the auxiliary cupped ring 152 and the braking wheel 153 to which it is attached, until the latching leg 157 of the locking lever drops into one of the slots 156 through the rim of the auxiliary cupped ring, thereby arresting the rotation of the auxiliary cupped ring and the outer gimbal to which it is attached at any intermediate angular position, at which the latching leg fits into one of the slots 156, 156a through the auxiliary cupped ring.

The caging spindle 61 is moved into the position shown in FIGURE 24, by the return spring of the rotary solenoid 98, which remains de-energized in this position.

The actuator roller 164c of the microswitch 164 at the cam end of the control lever 96 is forced outward by the cam 108, thus moving the microswitch plunger 164a into the activated position.

The uncage locking solenoid 107 is still de-energized, thus moving the plunger 106 thereof into engagement with the arcuate lower end of the control lever. The uncage locking solenoid 107 is controlled by the cage-uncage microswitch 119, which in this position, is open.

The caging motor 87 is energized, the caging spindle 61 being rotated by the gear 82 until the latching leg 157 of the locking lever 158 fits into one of the slots 156 through the rim of the auxiliary cupped ring 152, thereby arresting the rotation of the outer gimbal 40.

The caging motor 87 may be controlled by the microswitch 163, which is controlled by the actuator screw 90, which is attached to the latching leg 157 of the locking lever. In the intermediate position shown in dot-dash lines, FIGURE 24, the actuator screw 90 attached to the latching leg of the locking lever is out of engagement with the plunger 163a of the microswitch 163, thereby allowing the plunger 163a to move outward relative to the case thereof, into the activated position, substantially the same as that shown in FIGURE 23, and hereinbefore described.

Before the caging spindle 61 reaches the inner axis fully caged position shown in FIGURE 25, the latching leg 157 of the locking lever 158, which is controlled by the position of the spindle gear 82, which engages the screw 85 attached to the arm 162 of the locking lever 158 reaches an intermediate position 157b, shown by dash lines, FIGURE 27, and by dot-dash lines, FIGURE 25, in which the outer edge of the latching leg 157 of the locking lever 158 engages the inner circumferential edge of the rim 160 of the braking wheel, thereby retarding the rotation of the braking wheel and the outer gimbal 40 about the outer axis 41 of rotation of the gyro, until the slot 161 through the rim 160 of the braking wheel is aligned with the latching leg 157 of the locking lever, thereby allowing the latching leg of the locking lever to reach its fully caged position shown in FIGURE 25, and in that manner positively locking the outer gimbal of the gyro.

The cam surfaces 109a, 109b of the cam 108 at the short end of the control lever are out of engagement with the actuator roller 164c of the microswitch shown in FIGURE 24a, thereby allowing the plunger of the microswitch 164 to be moved to the open position.

In the inner axis fully caged position shown in FIGURE 25, the cylindrical portion of the head 64 of the caging spindle is inserted into the elongated recess 59 through the inner axis caging ring 45, the control lever having been moved into the angular position shown in FIGURE 25 by the uncage rotary solenoid 98.

The actuator roller of the microswitch 164, which is controlled by the cam 108 at the short end of the control lever 96 is free of the faces 109a, 109b of the cam 108, thus enabling the plunger 164a of the microswitch to move out of the case thereof into the activated or "cage" position similar to that shown in the wiring circuit, FIGURE 21.

The uncage locking solenoid 107 is de-energized, the plunger 106 thereof being pressed against the arcuate lower edge 104 of the control lever 96.

The uncage locking solenoid 107 is controlled by the externally mounted cage-uncage switch 119, similar to that shown in FIGURE 21, which in this position of the caging spindle has been moved into the "cage" position 119c, right-hand, FIGURE 21, thereby allowing the current to flow through the uncage locking solenoid 107, when the actuator spring-controlled switch 116 is moved into the activated position shown in FIGURE 21.

The uncage locking solenoid 107, is controlled by the microswitch 116 shown in FIGURE 16, the actuator arm 115 of which is released by the actuator spring 112, thereby allowing the formed plate spring 117, shown in FIGURE 16, to move the actuator arm 115 and the plunger of the microswitch toward the case thereof, and in that manner activating the microswitch 116.

The caging motor 87 is controlled by the latching lever controlled microswitch 163, the plunger of which in this position, is moved outward toward the case of the microswitch, to the open or inactivated position shown in FIGURE 25, by the actuator screw 90 attached to the latching leg 157 of the locking lever 158.

The cam 108 at the short end of the control lever is out of engagement with the actuator roller 164c of the microswitch 164, thereby allowing the plunger of the microswitch to move outward to the open position.

FIGURES 26 and 27 represent schematic cross-sections through the shaft of the caging spindle 61, and the latching leg 157 of the locking lever at various adjusted angular positions of the latching leg relative to the slot 161 through the rim 160 of the braking wheel 153 and the slots through the rim 155 of the auxiliary cupped ring 152 attached to the braking wheel, the sections being taken on the lines 26—26, FIGURE 24, and 27—27, FIGURE 25, respectively.

In FIGURE 26, the braking wheel 153 and the outer gimbal 40 are shown while in the process of rotation about the outer axis of the gyro, the slot 161 through the rim of the braking wheel being out of alignment with the nominal center line 170, which is the radial center line through the latching leg 157 of the locking lever.

In the first position 157a of the latching leg 157, the outer end of the latching leg is in its extreme angular position, away from the rim of the auxiliary cupped ring, which corresponds to the extreme uncaged position shown in FIGURE 23. In this position of the latching leg, it has no effect on the rotation of the outer gimbal 40.

In the second position 157b of the latching leg 157, shown in FIGURE 26, the outer surface of the latching leg 157 of the locking lever 158 is in engagement with the inner edge of the rim 155 of the auxiliary cupped ring, thereby restricting the rotation of the outer gimbal until one of the slots 156, 156a through the rim of the auxiliary cupped ring 152 is reached, at which point the latching leg of the locking lever moves into the position 157c shown in FIGURES 24 and 26, with the latching leg fitted to one of the slots 156, 156a through the rim 155 of the auxiliary cupped ring.

The intermediate position 157b of the latching leg 157 corresponds to the position shown by dot-dash lines, in FIGURE 24, in which the head of the caging spindle moves away from the completely uncaged position shown in FIGURE 23, in which the head of the caging spindle reaches the end of its movement away from the inner axis caging ring 45.

When one of the slots 156 through the rim 155 of the auxiliary cupped ring 152 is aligned with the latching leg 157 of the locking lever 158, the latching leg 157 moves into the slot 156 through the rim 155 of the auxiliary cupped ring 152, into the position shown in FIGURE 24, which corresponds to the inner axis caging position of the caging spindle shown in FIGURE 24, after the recess 59 through the inner axis caging ring 45 is aligned with the axis of the caging spindle 61, from which the head of the caging spindle can be moved into the fully caged position shown in FIGURE 25.

The latching leg 157 of the locking lever remains in engagement with the slot 156 through the rim 155 of the auxiliary cupped ring until the caging spindle approaches or reaches the fully caged position shown in FIGURE 25.

While the head of the caging spindle 61 is being moved into the fully caged position shown in FIGURE 25, but before it reaches it, the outer surface of the latching leg 157 of the locking lever engages the inner surface of the rim 160 of the braking wheel, in the position shown by dot-dash lines, FIGURE 25, or the position 157d shown by dash lines, in FIGURE 27, at which point the latching leg of the locking lever retards the rotation of the braking wheel and the outer gimbal 40 of the gyro, until the slot 161 through the rim 160 of the braking wheel is aligned with the latching leg 157 of the locking lever, which is the fully latched and caged position shown in FIGURE 25.

In this position of the latching leg 157 of the locking lever, which is shown in FIGURE 25, and at 157e in FIGURE 27, the gyro is fully caged about the inner and outer axes thereof.

FIGURE 28 is a side elevational view of the rim 155 or flange surrounding the auxiliary cupped ring shown in FIGURES 26 and 27, taken on the line 28—28, FIGURE 27.

A plurality of radially positioned equally-spaced slots 156, 156a is cut through the circumferential rim 155 of the auxiliary cupped ring 152, each of the slots 156, 156a being somewhat wider than the width of the latching leg 157 of the locking lever, thus enabling the latching leg 157 to be moved into one of the intermediate braking positions shown in FIGURE 26.

In order to allow the latching leg 157 of the locking lever 158 to move freely from the free position shown in FIGURE 23, to the fully caged latching position shown in FIGURE 25, a wide slot 156b wider than the slots 155 through the rim of the auxiliary cupped ring is cut through the rim of the auxiliary cupped ring 152 in radial alignment with the slot 161 through the rim 160 of the braking wheel 153.

This allows the latching leg 157 to move freely from the free position 157a shown in dot-dash lines, FIGURE 26, and in FIGURE 23, through the intermediate braking position shown at 157b, FIGURE 26, through the wide slot 156b through the rim 155 of the auxiliary cupped ring 152, into the braking wheel retarding position 157d, shown by dot-dash lines, FIGURE 25, and dash lines, FIGURE 27, at which it retards the rotation of the braking wheel 153 to the fully caged position shown in FIGURES 25 and 27, with the outer end of the latching leg of the braking lever fitted into the slot 161 through the rim 160 of the braking wheel, when the braking wheel slot 161 is aligned with the latching leg 157 of the locking lever.

FIGURES 29 and 30 show schematically the inner axis caging mechanism which is substantially the same as that shown in FIGURE 1, and another modification of the outer axis braking mechanism shown in FIGURES 23, 24 and 25.

The construction is essentially the same as that shown in FIGURE 13, except that an auxiliary rotary solenoid 171 having a central shaft 172 projecting outward therefrom, is substituted in place of the outer axis braking solenoid shown in FIGURES 1 and 13.

A ledge 183 of arcuate contour is formed at one edge of the widened portion of the control lever 178, adjacent the arcuate outer end thereof, the ledge 183 of the control lever being operative to engage the outer circumference of the ball bearing 180 to retain the control lever 178 in the outer angular position shown in FIGURE 29, when the caging spindle 61 is in the extreme uncaged position shown in FIGURE 29.

FIGURES 29 and 30 show schematically the steps in the process of moving the caging spindle 61 of the modified outer axis caging construction shown in FIGURES 29 and 30, from the extreme uncaged position shown in FIGURE 29, through the inner axis caging position shown in FIGURE 30 to the fully caged position shown in FIGURE 31.

When the caging spindle 61 is in the uncaged position shown in FIGURE 29, after the inner caging ring has been rotated into the position shown in FIGURES 9 and 31, with the recess 59 through the inner caging ring in alignment with the cylindrical head 64 of the caging spindle 61, the head 64 of the caging spindle is free of the rim rails 60, 60a surrounding the inner caging ring 45.

The shaft of the auxiliary rotary solenoid has a substantially circular disc 173 attached thereto, a boss 174, located adjacent the outer circumference of the disc 173 having a right angle bracket 175 attached thereto, the projecting leg 175a of the bracket, which is substantially parallel to the axis of the caging spindle, in the inner axis caging position shown in FIGURE 30, having a screw 176 threadably attached thereto, the point of the screw 176 being operative to fit into one of the circumferential grooves surrounding the outer circumference of the braking wheel, when the auxiliary rotary solenoid 171 rotates the disc into the inner axis fully caged position shown in FIGURE 31, in a manner hereinafter described in greater detail. A lock nut 177 is threadably fitted to the screw, the lock nut 177 abutting the projecting leg 175a of the bracket.

A control lever 178 similar to that shown in FIGURES 1 and 13, is supported by the shaft 97 of the uncage rotary solenoid 98, the lower end of the control lever being of arcuate contour 179, in the same manner as that shown in FIGURES 1 and 13.

A ball bearing 180 which is supported by a pin or screw 181 attached to the circular disc, is mounted on one face of the disc 173 near the outer circumference thereof, the outer race of the ball bearing being operative to engage the arcuate outer edge of the control lever 178 to limit the angular movement of the circular disc 173 and the screw attached thereto when the head 64 of the caging spindle is moved into the fully caged position shown in FIGURE 31.

In order to move the caging spindle 61 into the uncaged position shown in FIGURE 29, the power torque of the rotary solenoid 98 rotates the shaft 97 thereof with the control lever 178 attached thereto in the direction of the arrow 113, shown in FIGURE 29, until the head of the caging spindle reaches a limiting stop, the head 64 of the caging spindle being completely free of the rim rails 60, 60a, surrounding the inner axis caging ring.

With the auxiliary rotary solenoid de-energized, the return spring of the auxiliary rotary solenoid 171 is operative to rotate the shaft 172 of the auxiliary rotary solenoid in the direction shown by the arrow 184a, FIGURE 29, until the ball bearing 180, attached to the disc 173 on the shaft on the auxiliary rotary solenoid 171, engages the ledge 183 of the control lever 178, thereby retaining the control lever, and the caging spindle 61 attached thereto, in the uncaged position shown in FIGURE 29.

The long arm of the control lever has an actuator spring 112 attached thereto, in the same manner as that shown in FIGURES 1, 11 and 12, a channel 185 being cut out of the outer end of the control lever adjacent the free end of the actuator spring 112.

The microswitch 186 mounted adjacent the actuator spring 112 is substantially the same as that shown in FIGURE 16, and hereinbefore described.

When the control lever is in the position shown in FIGURE 29, the actuator spring 112 attached to the control lever 178 moves the actuator arm 186b of the microswitch into the uncaged or open position, thereby de-energizing the uncaging rotary solenoid, and in that manner allowing the return spring of the rotary solenoid to move the caging spindle into the fully caged position shown in FIGURE 31.

In the caging spindle position shown in FIGURE 29, the return spring of the auxiliary rotary solenoid rotates the disc 173 attached to the shaft 172 of the auxiliary rotary solenoid 171 into the position shown in FIGURE 29, with the point of the screw 176 completely free of the grooves surrounding the outer circumference of the braking wheel 72.

In this position, the external cage-uncage switch 119 shown in FIGURE 21 is in the uncage or open position, thereby de-energizing the caging motor 87 similar to that shown in FIGURE 13, and preventing rotation of the spur gear 82 which is attached to the shaft 62 of the caging spindle.

The cylindrical body of the head of the caging spindle is substantially the same as that shown in FIGURE 1, the caging function being performed in substantially the same manner.

The projecting head of the pin attached to the inner caging ring, and the radial slots through the flange 68 of the caging spindle are substantially the same as those shown in FIGURES 1 and 13, the rotation of the outer gimbal 40 of the gyro about the outer axis 41 thereof being accomplished in the same manner.

The braking wheel 72 shown in FIGURE 29 is essentially the same as that shown in FIGURE 1, the teeth 74 and the grooves surrounding the braking wheel being substantially the same.

The circular rim 75 surrounding the braking wheel, is substantially the same as that shown in FIGURE 1, the rim having a rectangular slot 76 therethrough, into which the latching leg 77 of the locking lever 78 is fitted, to positively lock the outer gimbal 40 about the outer axis 41 of the gyro, in the fully caged position, shown in FIGURE 31.

The tubular sleeve 81 fitted to the shaft 62 of the caging spindle 61 and the spur spindle drive gear 82 attached thereto or integral therewith, are essentially the same as those shown in FIGURES 1 and 13.

The yoke 187 which is attached to the control lever 178 is slidably fitted to the sleeve surrounding the shaft of the caging spindle, and functions in substantially the same manner as that shown in FIGURES 1 and 13.

Before the inner caging ring reaches the position shown in FIGURES 9 and 31, with the recess through the inner axis caging ring 45 aligned with the cylindrical portion of the head of the caging spindle, it is necessary to rotate the caging ring 45 into this position.

The head of the caging spindle is moved into a position in which the open contact surface of the head of the caging spindle, is in contact with one of the rim rails 60, 60a surrounding the inner caging ring 45, as shown in FIGURE 30.

The control lever 178 and the caging spindle 61 attached thereto are moved into the position shown in FIGURE 30, with the open end of the head of the caging spindle in engagement with one of the rim rails 60, 60a surrounding the inner caging ring, by the return spring of the uncage rotary solenoid 98, which rotates the shaft of the uncage rotary solenoid in the direction of the arrow 120, shown in FIGURE 30, the uncage rotary solenoid 98 being de-energized.

While the caging spindle is in the caging position shown in FIGURE 30, the external cage-uncage switch 119 is in the "cage" position, or open in the direction of the uncaging rotary solenoid, so that the uncaging rotary solenoid is de-energized.

The caging motor 87 such as that shown in FIGURES 24 and 25, which is also controlled by the external cage-uncage switch is energized during the rotation of the caging ring into the caging position shown in FIGURE 30.

In this position, the auxiliary rotary solenoid 171 is energized, the power torque thereof being operative to rotate the shaft 172 of the auxiliary rotary solenoid and the disc attached thereto into the position shown in FIGURE 30, with the point of the screw 176 in engagement with one of the grooves surrounding the braking wheel, thereby arresting the rotation of the braking wheel and preventing rotation of the outer gimbal 40 of the gyro.

The auxiliary rotary solenoid 171 is controlled by the cam-controlled microswitch 188 which is mounted adjacent the cam end of the control lever 178 in the same manner as that shown in FIGURES 11 and 12.

In this position of the control lever, the cam 108 forces the actuator roller 188c of the microswitch 188 toward the case thereof, thereby activating the microswitch and energizing the auxiliary rotary solenoid 171.

The caging motor is controlled by the microswitch 189, the plunger of which is engaged by an actuator screw 90 which is attached to the latching leg of the locking lever, which is substantially the same as that shown in FIGURES 11 and 12. In the uncaged position shown in FIGURE 29, the locking lever is in the open or unlatched position, the actuator screw thereof being free of the plunger of the microswitch 189, thereby moving the plunger of the microswitch into the activated position, and in that manner enabling the external cage-uncage switch 119 to energize the caging motor 87, when it is moved into the "cage" position 119c shown in FIGURE 21.

In the inner axis fully caged position shown in FIGURE 31, the cylindrical head 64 of the caging spindle is inserted into the recess 59 through the inner caging ring 45, the control lever 178 having been moved angularly toward the inner caging ring 45, in the position shown in FIGURE 31.

The head of the caging spindle 61 and the control lever 178 are moved into the fully caged position shown in FIGURE 31, by the return spring of the rotary solenoid 98 which remains de-energized.

The shaft of the auxiliary rotary solenoid is rotated into a position at which the circular disc 173 attached thereto is in the position shown in FIGURE 31, by the return spring of the auxiliary rotary solenoid, the auxiliary rotary solenoid being de-energized.

In this control lever position, the cam surfaces 109a, 109b, of the cam 108 are free of the actuating roller 188c of the microswitch 188, thereby allowing the actuator arm of the microswitch to move away from the case thereof, into the open position, shown in FIGURE 31.

The ball bearing 180 supported at the surface of the rotatable disc 173 engages the arcuate outer end 179 of the control lever 178, thus limiting the angular movement of the circular disc 173 in one direction.

The screw 176 supported by one leg 175a of the bracket attached to the circular disc 173 is moved completely out of engagement with the circumferential grooves around the braking wheel 72, thus allowing the braking wheel to be rotated freely.

The caging motor is energized, thus rotating the spur gear 82 attached to the caging spindle shaft, after the caging spindle is in the caged position shown in FIGURE 31.

The microswitch 189 which is controlled by the actuator screw attached to the latching leg 77 of the locking lever 78 remains in the activated position shown in FIGURE 29, until the latching leg 77 of the locking lever 78 is moved into the latching position, shown in FIGURE 31. After the outer gimbal 40 and the braking wheel attached thereto are moved into a position in which the slot 76 through the rim 75 of the braking wheel 72 is in alignment with the latching leg 77 of the locking lever 78, the latching leg 77 of the locking lever is drawn into the slot 76 by the tension spring 88, which is attached thereto, thereby locking the braking wheel and the outer gimbal of the gyro in substantially the same manner as that shown in FIGURE 12.

The arrangement of the microswitches shown in FIGURES 11, 12, 23, 24, 25 and 29, 30, 31 and the method of controlling them, is essentially schematic. The microswitches may therefore be re-arranged and the method of controlling them altered as long as the selected microswitches energize the caging motor 87, the various solenoids, and the rotary solenoids 98 and 171 in accordance with the requirements of the wiring circuits shown in FIGURES 21 and 22, and the modifications thereof hereinbefore described.

In a modification of the preset caging construction shown in FIGURE 13, as shown in the schematic, FIGURE 32, the gyro construction and the inner axis caging mechanism used in conjunction therewith, are substantially the same as those shown in FIGURE 13 and hereinbefore described.

The caging spindle 61 is substantially the same as that shown in FIGURES 1 and 13, the caging spindle being supported and functioning in substantially the same manner.

The uncaging rotary solenoid 98 is substantially the same as that shown in FIGURE 13 and hereinbefore described.

The caging motor cut-off switch 151 which is shown in FIGURE 32 is utilized to de-energize the preset circuit, when the external cage-uncage switch 140 is in the "uncage" position, shown in FIGURE 22. This cut-off switch is shown in the preset wiring circuit, FIGURE 22.

The transfer relay 148, shown in FIGURE 32, is substituted in place of the locking lever 78, shown in FIGURE 1. This transfer relay 148 which is also shown in the wiring circuit, FIGURE 22, transfers the caging motor 139 shown in FIGURE 13 to the preset power source 146, 146a in the wiring circuit, FIGURE 22.

The transfer relay 148 shown in FIGURE 32 is mechanically connected to the two switches 150, 151 and in that manner controls the operation of the two switches 150, 151 shown in the wiring circuit, FIGURE 22.

In all other respects, the preset unit shown in FIGURE 32 is substantially the same as that shown in FIGURE 13 and hereinbefore described.

The arrangement of the various elements and components of the two-axis caging mechanism shown in FIGURES 1 and 2, and the preset construction shown in FIGURES 13, 14, 15 and 32, may be varied to some extent, the essentials of the construction and the method of operation and utilization of the assembled unit, remaining substantially as shown in FIGURES 1, 2 and 13, and hereinbefore described.

In the same manner, the modified construction shown in FIGURES 23, 24 and 25, and that shown in FIGURES 29, 30 and 31 may also be varied to some extent, insofar as the arrangement and inter-relation of the various elements and components thereof are concerned, the essentials of the construction and the method of operation and utilization of the modified construction remaining substantially as shown in the drawings and hereinbefore described.

It will be apparent to those skilled in the art, that my present invention and the various modifications thereof, are not limited to the specific details described above and shown in the drawings, and that various further modifications are possible in carrying out the features of the invention and the operation and the method of support, mounting, wiring actuation and utilization of the various modifications thereof, without departing from the spirit and scope of the appended claims.

What is claimed is:

1. In combination with a gyro having a housing with an outer gimbal rotatably supported by said housing, an inner caging ring rotatably supported by the outer gimbal on an inner axis of rotation in axial alignment with and substantially perpendicular to the axis of rotation of the outer gimbal, a motor driven rotor rotatably supported by the inner caging ring, a caging mechanism including a caging member reciprocatively and rotatably supported by the housing, co-axially with the axis of rotation of the outer gimbal, said inner caging ring having an opening therethrough operative to receive a portion of the caging member, the inner caging ring having projecting means attached thereto operative to rotate the inner caging ring, to align the opening through the inner caging ring with the axis of rotation of the caging member, when said projecting means is in contact with the rotating projecting end of the caging member, said projecting means being operative to rotate the inner caging ring to move the opening therethrough toward the axis of rotation of the caging member when the caging member is rotated in a predetermined direction, the caging member having an integral substantially cylindrical projecting portion thereof operative to fit into the opening through the inner caging ring to lock the inner caging ring about the inner axis of rotation of the gyro, a substantially circular braking member fixedly attached to the outer gimbal co-axially therewith, and means supported by the housing operative to engage the circular braking member to arrest the rotation of the outer gimbal, about the outer axis of rotation of the gyro.

2. A combination gyro and caging mechanism as in claim 1, in which the circular braking member attached to the outer gimbal of the gyro has means formed thereon, operative to co-act with a latching member controlled by the reciprocating movement of the caging member to lock the circular braking member and the gyro outer gimbal at a predetermined rotational angular position of the gyro outer gimbal.

3. A combination gyro and caging mechanism, as in claim 1, in which the caging member has a substantially circular drive member fixedly attached thereto, co-axially therewith, and motor driven means operative to engage the circular drive member to rotate the circular drive member and the caging member when the motor driven means is energized.

4. A combination gyro and caging mechanism as in claim 1, including a pivoted control lever mounted adjacent the caging member, a rotatable support shaft supporting the pivoted control lever, located in a plane substantially parallel to the plane through the axis of rotation of the caging member, the axis of rotation of the control member support shaft being substantially perpendicular to the axis of rotation of the caging member, electrically driven means supporting the support shaft, operative to rotate the support shaft, and means formed on said pivoted control lever operative to axially move the caging member co-ordinated with the angular movement of the control member, while permitting free rotation of the caging member.

5. A combination gyro and caging mechanism as in claim 1, including a pivoted control member mounted adjacent the caging member, a rotatable shaft supporting the pivoted control member located in a plane substantially parallel to the plane through the axis of rotation of the caging member, the axis of rotation of the support shaft being substantially perpendicular to the axis of rotation of the caging member, the pivoted control member having a circular segmental face and a notch formed therein, at one end thereof, and electrical controllable means operative to engage the circular segmental face of the control member to restrain the angular movement of the pivoted control member, the electrical controllable means being operative to selectively fit into the notch in the pivoted control member to prevent angular movement of the pivoted control member at one angular position thereof.

6. A combination gyro and caging mechanism as in claim 1, in which the circular braking member has a circular rim integral and co-axial therewith, the circular rim having a radially positioned slot therethrough, a pivoted locking lever mounted adjacent the rim of the braking member in substantial radial alignment with the slot through the rim of the braking member, the pivoted locking lever having means formed thereon operative to fit into the slot through the rim of the braking member to latch the braking member and the gyro outer gimbal attached thereto, means attached to the locking lever operative to control the angular movement thereof, and means attached to the caging member operative to engage the angle control means attached to the locking lever to co-ordinate the angular movement of the locking lever with the reciprocating movement of the caging member.

7. A multiple-axis caging mechanism in combination with a gyro having a housing with an outer gimbal rotatably supported by said housing, an annular inner caging ring rotatably supported by the outer gimbal on an inner axis of rotation in axial alignment with and substantially perpendicular to the outer axis of rotation of the outer gimbal, a rotor rotatably mounted, within the inner caging ring, on a rotational axis substantially perpendicular to the inner axis of rotation of the inner caging ring, said caging mechanism comprising a caging member reciprocatively and rotatably supported by the housing co-axially with the outer axis of rotation of the outer gimbal, the rotation of the caging member being operative to control the rotational angular position of the inner caging ring about the inner axis of rotation, the caging member being operative to engage the inner caging ring to lock the inner caging ring in a predetermined rotational angular position relative to the outer axis of rotation of the outer gimbal, means projecting beyond the circumferential outer surface of the inner caging ring operative to engage the caging member, said caging member being operative to rotate the inner caging ring and the outer gimbal of the gyro about the outer axis of rotation of the gyro, while in contact with the projecting means attached to the inner caging ring, a substantially circular braking member fixedly attached to the outer gimbal co-axially therewith, and a locking member pivotally supported by the housing in radial alignment with the braking member, said braking member having means formed therein adapted to receive the locking member, to lock the braking member in a predetermined rotational angular position relative to the housing, the inner caging ring having a pair of substantially parallel circular segmental rim rails projecting around the outer circumference thereof, said rim rails being located on opposite sides of the longitudinal axis of the caging member having a substantially cylindrical cup-shaped head integral with the end thereof, adapted to be moved into engagement with the rim rails surrounding the inner caging ring, the annular rim of the cup-shaped head being operative to engage the circular segmental rim rails, said rim rails being radially offset relative to one another to permit the rotation of the head of the caging member to control the direction of rotation of the inner caging ring, the caging member having a substantially circular flange integral with the head thereof, the circular flange being spacedly located relative to the rim rails of the inner caging ring, the inner caging ring having an opening therethrough, the plane through the axis of the opening being in substantial alignment with the longitudinal axis of the caging member, the rim rails surrounding the inner caging ring being so positioned relative to the caging member as to rotate the inner caging ring in a direction to move the opening through the inner caging ring toward the axis of rotation of the caging member, for predetermined direction of rotation of the caging member, the head of the caging member being operative to fit into the opening through the inner caging ring to prevent rotation of the inner ring about the inner axis of the gyro.

8. A multiple axis caging mechanism for a gyro, as in claim 7, in which caging ring and the outer gimbal co-ordinated therewith about the outer axis of the gyro, substantially perpendicularly to the inner axis of rotation.

9. A multiple axis caging mechanism for a gyro, as in claim 11, in which the inner caging ring has a pin fixedly attached thereto, projecting radially outward therefrom, the flange of the caging member having a plurality of radially positioned slots therethrough, in selective radial alignment with the projecting pin attached to the inner caging ring, a locking lever support bracket fixedly attached to the housing, a locking lever pivotally supported by the bracket, a portion of said locking lever being in substantially radial alignment with the circular braking member, the circular braking member having a substantially circular rim integral and co-axial therewith, the circular rim having a substantially radially positioned slot therethrough in radial alignment with a portion of the locking lever, a portion of said locking lever being operative to fit into the slot through the rim of the braking member to lock the outer gimbal about the outer axis of rotation thereof.

10. In combination with a gyro having a housing with an outer gimbal rotatably supported by said housing, an annular inner caging ring rotatably supported by the outer gimbal on an inner axis of rotation in axial alignment with and substantially perpendicular to the outer axis of rotation of the outer gimbal, a gyro rotor rotatably mounted within the inner caging ring, a multiple axis caging mechanism including a caging spindle reciprocatingly and rotatably supported by the housing, co-axially with the axis of rotation of the outer gimbal, circumferential means surrounding the inner caging ring operative to rotate the inner caging ring, when a coacting surface of the rotating caging spindle is in contact with the circumferential means, the inner caging ring having an opening therethrough in a plane aligned with a plane through the axis of rotation of the caging spindle, the circumferential means surrounding the inner caging ring being co-ordinated in such a manner as to rotate the inner caging ring in a direction toward the axis of rotation of the caging spindle co-ordinated with a predetermined member and the caging member when the motor driven means is energized.

4. A combination gyro and caging mechanism as in claim 1, including a pivoted control lever mounted adjacent the caging member, a rotatable support shaft supporting the pivoted control lever, located in a plane substantially parallel to the plane through the axis of rotation of the caging member, the axis of rotation of the control member support shaft being substantially perpendicular to the axis of rotation of the caging member, electrically driven means supporting the support shaft, operative to rotate the support shaft, and means formed on said pivoted control lever operative to axially move the caging member co-ordinated with the angular movement of the control member, while permitting free rotation of the caging member.

5. A combination gyro and caging mechanism as in claim 1, including a pivoted control member mounted adjacent the caging member, a rotatable shaft supporting the pivoted control member located in a plane substantially parallel to the plane through the axis of rotation of the caging member, the axis of rotation of the support shaft being substantially perpendicular to the axis of rotation of the caging member, the pivoted control member having a circular segmental face and a notch formed therein, at one end thereof, and electrical controllable means operative to engage the circular segmental face of the control member to restrain the angular movement of the pivoted control member, the electrical controllable means being operative to selectively fit into the notch in the pivoted control member to prevent angular movement of the pivoted control member at one angular position thereof.

6. A combination gyro and caging mechanism as in claim 1, in which the circular braking member has a circular rim integral and co-axial therewith, the circular rim having a radially positioned slot therethrough, a pivoted locking lever mounted adjacent the rim of the braking member in substantial radial alignment with the slot through the rim of the braking member, the pivoted locking lever having means formed thereon operative to fit into the slot through the rim of the braking member to latch the braking member and the gyro outer gimbal attached thereto, means attached to the locking lever operative to control the angular movement thereof, and means attached to the caging member operative to engage the angle control means attached to the locking lever to co-ordinate the angular movement of the locking lever with the reciprocating movement of the caging member.

7. A multiple-axis caging mechanism in combination with a gyro having a housing with an outer gimbal rotatably supported by said housing, an annular inner caging ring rotatably supported by the outer gimbal on an inner axis of rotation in axial alignment with and substantially perpendicular to the outer axis of rotation of the outer gimbal, a rotor rotatably mounted, within the inner caging ring, on a rotational axis substantially perpendicular to the inner axis of rotation of the inner caging ring, said caging mechanism comprising a caging member reciprocatively and rotatably supported by the housing co-axially with the outer axis of rotation of the outer gimbal, the rotation of the caging member being operative to control the rotational angular position of the inner caging ring about the inner axis of rotation, the caging member being operative to engage the inner caging ring to lock the inner caging ring in a predetermined rotational angular position relative to the outer axis of rotation of the outer gimbal, means projecting beyond the circumferential outer surface of the inner caging ring operative to engage the caging member, said caging member being operative to rotate the inner caging ring and the outer gimbal of the gyro about the outer axis of rotation of the gyro, while in contact with the projecting means attached to the inner caging ring, a substantially circular braking member fixedly attached to the outer gimbal co-axially therewith, and a locking member pivotally supported by the housing in radial alignment with the braking member, said braking member having means formed therein adapted to receive the locking member, to lock the braking member in a predetermined rotational angular position relative to the housing, the inner caging ring having a pair of substantially parallel circular segmental rim rails projecting around the outer circumference thereof, said rim rails being located on opposite sides of the longitudinal axis of the caging member having a substantially cylindrical cup-shaped head integral with the end thereof, adapted to be moved into engagement with the rim rails surrounding the inner caging ring, the annular rim of the cup-shaped head being operative to engage the circular segmental rim rails, said rim rails being radially offset relative to one another to permit the rotation of the head of the caging member to control the direction of rotation of the inner caging ring, the caging member having a substantially circular flange integral with the head thereof, the circular flange being spacedly located relative to the rim rails of the inner caging ring, the inner caging ring having an opening therethrough, the plane through the axis of the opening being in substantial alignment with the longitudinal axis of the caging member, the rim rails surrounding the inner caging ring being so positioned relative to the caging member as to rotate the inner caging ring in a direction to move the opening through the inner caging ring toward the axis of rotation of the caging member, for predetermined direction of rotation of the caging member, the head of the caging member being operative to fit into the opening through the inner caging ring to prevent rotation of the inner ring about the inner axis of the gyro.

8. A multiple axis caging mechanism for a gyro, as in claim 7, in which caging ring and the outer gimbal co-ordinated therewith about the outer axis of the gyro, substantially perpendicularly to the inner axis of rotation.

9. A multiple axis caging mechanism for a gyro, as in claim 11, in which the inner caging ring has a pin fixedly attached thereto, projecting radially outward therefrom, the flange of the caging member having a plurality of radially positioned slots therethrough, in selective radial alignment with the projecting pin attached to the inner caging ring, a locking lever support bracket fixedly attached to the housing, a locking lever pivotally supported by the bracket, a portion of said locking lever being in substantially radial alignment with the circular braking member, the circular braking member having a substantially circular rim integral and co-axial therewith, the circular rim having a substantially radially positioned slot therethrough in radial alignment with a portion of the locking lever, a portion of said locking lever being operative to fit into the slot through the rim of the braking member to lock the outer gimbal about the outer axis of rotation thereof.

10. In combination with a gyro having a housing with an outer gimbal rotatably supported by said housing, an annular inner caging ring rotatably supported by the outer gimbal on an inner axis of rotation in axial alignment with and substantially perpendicular to the outer axis of rotation of the outer gimbal, a gyro rotor rotatably mounted within the inner caging ring, a multiple axis caging mechanism including a caging spindle reciprocatingly and rotatably supported by the housing, co-axially with the axis of rotation of the outer gimbal, circumferential means surrounding the inner caging ring operative to rotate the inner caging ring, when a coacting surface of the rotating caging spindle is in contact with the circumferential means, the inner caging ring having an opening therethrough in a plane aligned with a plane through the axis of rotation of the caging spindle, the circumferential means surrounding the inner caging ring being co-ordinated in such a manner as to rotate the inner caging ring in a direction toward the axis of rotation of the caging spindle co-ordinated with a predetermined direction of rotation of the caging spindle, a portion of the caging spindle being operative to fit into the opening through the inner caging ring, means projecting beyond the circumferential outer surface of the inner caging ring operative to engage a mating portion of the caging spindle, said caging spindle being operative to rotate the inner axis caging ring and the outer gimbal of the gyro about the outer axis of rotation of the gyro while the caging spindle is in engagement with the projecting means, a substantially circular breaking wheel fixedly attached to the outer gimbal co-axially therewith, and means operative to engage said braking wheel to restrain the rotation thereof.

11. A combination gyro and multiple axis caging mechanism as in claim 10, in which the caging spindle includes a substantially cylindrical stem with a substantially cylindrical head integral with the end of the stem adjacent the outer circumference of the inner caging ring, the axis of rotation of the stem being radially positioned relative to the inner caging ring, the head of the caging spindle being operative to fit into the mating opening through the inner caging ring to prevent rotation thereof about the inner axis of the gyro, electrically controllable means operative to engage the stem of the caging spindle to move the head of the caging spindle into the opening through the inner caging ring, when the opening through the inner caging ring is co-axial with the head of the caging spindle.

12. A combination gyro and caging mechanism as in claim 10, including a pivoted control level mounted adjacent the caging spindle, a rotatable support shaft supporting the pivoted control lever located in a plane parallel to the plane through the axis of rotation of the caging spindle, the axis of rotation of the support shaft being substantially perpendicular to the axis of rotation of the caging spindle, electrically driven means operative to rotate the rotatable support shaft, means formed on the control lever operative to longitudinally move the caging spindle, co-ordinated with the angular position of the control lever, a plurality of cams attached to one end of the control lever, the circular braking wheel having a plurality of radially positioned grooves around the outer circumference thereof, an electrically operated braking solenoid mounted in substantial radial alignment with the braking wheel, said braking solenoid having a reciprocating plunger concentric therewith, the reciprocating plunger being in substantial radial alignment with the grooves around the braking wheel, said reciprocating plunger being operative to engage any one of the circumferential grooves around the braking wheel to arrest the rotation of the braking wheel, a substantially circular gear attached to the caging spindle, a caging pinion meshing with the circular gear operative to rotate the caging spindle, a caging motor driving the caging pinion, switching means normally controlled by the angular position of the control lever, and a switch mounted adjacent the cam end of the control lever, said cam actuated switch being operative to control the energizing of the braking solenoid, co-ordinated with the longitudinal position of the caging spindle.

13. A combination gyro and multiple axis caging mechanism, as in claim 10, in which the caging spindle includes a substantially cylindrical stem, with a substantially cylindrical head integral with the end of the stem adjacent the outer circumference of the inner caging ring, the cylindrical head of the caging spindle being operative to fit into the mating opening through the inner caging ring to prevent rotation thereof about the inner axis of the gyro, the stem of the caging spindle having a sleeve with a pair of substantially integral circular flanges attached thereto concentrically therewith, the flanges being spacedly located relative to one another, and relative to the head of the caging spindle, a pivoted control lever mounted adjacent the caging spindle, a rotatable support shaft supporting the pivoted control lever located in a plane substantially parallel to the plane through the axis of rotation of the caging spindle, the axis of rotation of the pivoted control lever being substantially perpendicular to the axis of rotation of the caging spindle, electrically energized means operative to rotate the rotatable support shaft, and means formed on the control lever operative to engage the flanges of the caging spindle sleeve to axially move the caging spindle, relative to the inner caging ring, co-ordinated with the angular movement of the control lever, while permitting free rotation of the caging spindle, the pivoted control lever being operative to move the head of the caging spindle into the mating opening through the inner caging ring, when the opening through the inner caging ring is in co-axial alignment with the head of the caging spindle, the pivoted control lever being in continuous engagement with the spaced flanges of the sleeve attached to the stem of the caging spindle, to move the head of the caging spindle radially out of the opening through the inner caging ring to uncage the inner caging ring.

References Cited by the Examiner

UNITED STATES PATENTS

| | | | |
|---|---|---|---|
| 2,722,124 | 11/1955 | Smith | 74—5.1 |
| 2,786,356 | 3/1957 | Klose | 74—5.1 |

BROUGHTON G. DURHAM, *Primary Examiner.*

T. W. SHEAR, *Assistant Examiner.*